United States Patent
Sakabe et al.

(10) Patent No.: US 7,200,515 B2
(45) Date of Patent: Apr. 3, 2007

(54) ROTATION ANGLE SENSOR

(75) Inventors: Takashi Sakabe, Shizuoka (JP); Emi Takuma, Shizuoka (JP); Atsushi Ueno, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/049,082

(22) Filed: Feb. 3, 2005

(65) Prior Publication Data
US 2005/0171727 A1    Aug. 4, 2005

(30) Foreign Application Priority Data
Feb. 3, 2004   (JP)   ............ P2004-026714
Apr. 28, 2004  (JP)   ............ P2004-134430

(51) Int. Cl.
*G01D 5/12*   (2006.01)

(52) U.S. Cl. .......... 702/151; 33/1 PT; 33/707; 33/708; 701/41; 180/444; 73/862.326

(58) Field of Classification Search .......... 702/151, 702/150, 163, 104; 324/207.22, 207.25; 73/200, 862.326; 33/1 PT, 707, 708; 701/90, 701/41; 180/444, 197, 446
See application file for complete search history.

(56) References Cited

U.S. PATENT DOCUMENTS 4,651,840 A * 3/1987 Shimizu et al. ............ 180/446
5,930,905 A   8/1999 Zabler et al.
6,552,533 B2 * 4/2003 Schodlbauer et al. .. 324/207.22
2003/0056583 A1 3/2003 Schodlbauer et al.

FOREIGN PATENT DOCUMENTS

EP   1 522 486 A2   4/2005
JP   11-500828      1/1999

* cited by examiner

*Primary Examiner*—John Barlow
*Assistant Examiner*—Hien Vo
(74) *Attorney, Agent, or Firm*—Finnegan, Henderson, Farabow, Garrett & Dunner, L.L.P.

(57) ABSTRACT

A rotation angle sensor includes a first and a second detection gears rotatable with a steering shaft, a first detector configured to detect a rotation angle of the first detection gear, a second detector configured to detect a rotation angle of the second detection gear, a processor configured to calculate a rotation angle of the steering shaft based on the rotation angles detected by the first and second detectors and a discriminator configured to discriminate whether the rotational angle of the steering shaft, calculated by the processor, falls in an abnormal value, wherein a least common multiple between a cycle of the first detector and a cycle of the second detector is greater than a steering angle measurement range.

14 Claims, 21 Drawing Sheets

Prior Art

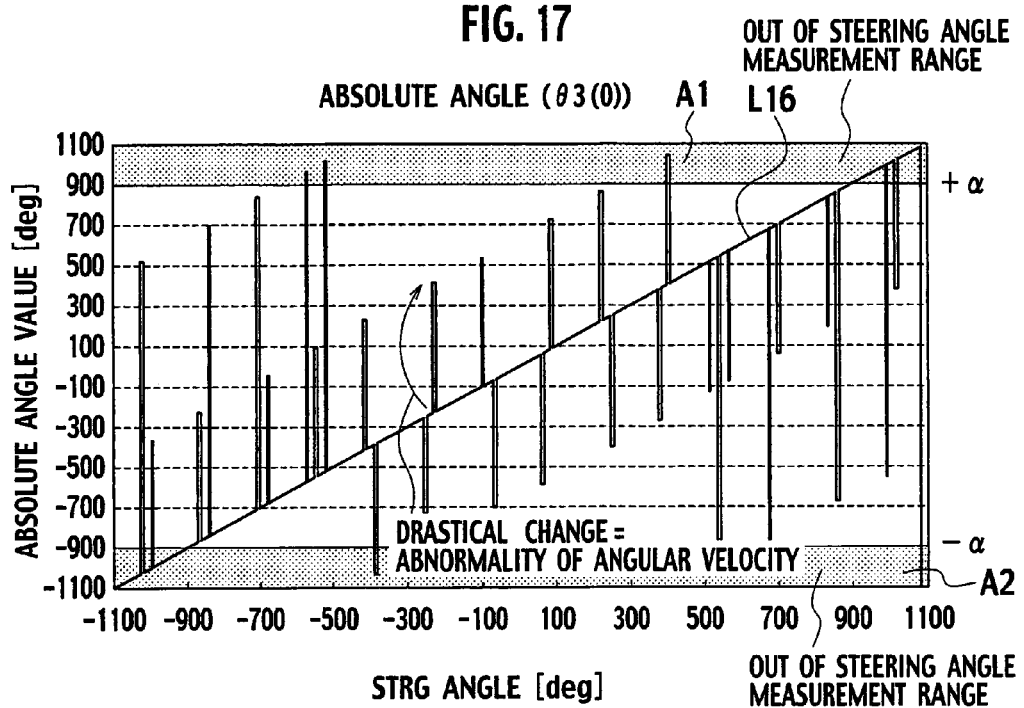
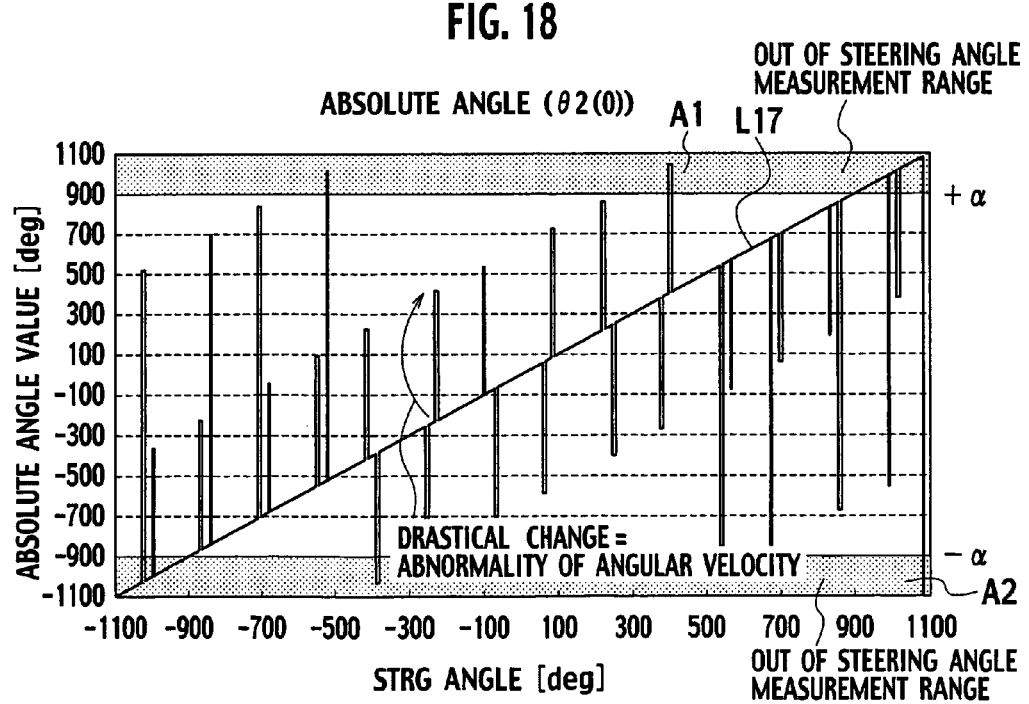

ROTATION ANGLE SENSOR

CROSS REFERENCE TO RELATED APPLICATIONS

This application is based upon and claims the benefit of priority from prior Japanese Patent Application P2004-134430 filed on Apr. 28, 2004; the entire contents of which are incorporated by reference herein.

BACKGROUND OF THE INVENTION

1. Field of the Invention

The present invention relates to a rotation angle sensor that is able to detect a rotation angle of a steering shaft.

2. Description of the Related Art

In the related art, there has been known a rotation angle sensor installed on a vehicle for detecting a rotation angle of a steering shaft.

FIG. 1 is a schematic view of a rotation angle sensor 100 of the related art. As shown in FIG. 1, the rotation angle sensor 100 is comprised of a main gear 101, detection gears 102,103, magnet sensors 104,105 and a processor 106.

The main gear 101 integrally rotates with a steering shaft. The detection gears 102, 103 rotate directly with the main gear 101 at a higher speed than the main gear 101. The magnet sensor 104 detects an absolute angle of the detection gear 102 in a value ranging from 0 to 180 [deg] to output a detection signal. The magnet sensor 105 detects an absolute angle of the detection gear 103 in a value ranging from 0 to 180 [deg] to output a detection signal. The processor 106 calculates an absolute angle of the steering shaft depending on detection signals delivered from the magnet sensors 104, 105. As used herein, the term "absolute angle" refers to a rotation angle uniquely determined within a rotatable range. For instance, if an apparent rotation angle of the steering shaft lies at 10 [deg], the absolute angle of the steering shaft lies at 10 [deg], 370 [deg], 730 [deg], . . . depending on the number of rotations of the steering shaft.

Further, the processor 106 monitors cycle variations of the magnet sensors 104, 105 and calculates a given numeric value k based on the detection signals delivered from the magnet sensors 104, 105 and gear teeth of the detection gears 102, 103. Then, the processor 106 discriminates based on the calculated numeric value k and the cycle variations of the magnet sensors 104, 105 to find whether the absolute angle of the steering shaft, calculated by the processor 106, falls in an abnormal value.

More particularly, the processor 106 monitors the cycle variations of the magnet sensors 104, 105 and, as a result, if the numeric value k drastically varies due to the cyclic variations to an extent that is normally unthinkable or when the numeric value varies with no cycle variations, discriminates that the calculated absolute angle of the steering shaft lies in the abnormal value.

Also, as used herein the term "a cycle of the magnet sensor 104" refers to an angle at which the steering shaft rotates during a period in which the detection gear 102 rotates at an angle of 180 [deg] and the term "a cycle of the magnet sensor 105" refers to an angle at which the steering shaft rotates during a period in which the detection gear 103 rotates one turn.

However, under circumstances where the gear teeth of the detection gears 102, 103 take the other value than particular gear teeth, the above described technology encounters issues wherein the processor 106 is hard to discriminate whether the absolute angle of the steering shaft calculated by the processor 106 falls in the abnormal value.

Further, if the steering shaft has to remain operative, the processor 106 cannot discriminate whether the absolute angle of the steering shaft, calculated by the processor 106, lies at the abnormal value. Accordingly, when the rotation angle sensor 100 is powered on, the processor 106 cannot discriminate whether the absolute angle of the steering shaft, calculated by the processor 106, falls in the abnormal value.

SUMMARY OF THE INVENTION

The present invention has been completed with a view to addressing the above issues and it is a first object of the present invention to provide a rotation angle sensor that is able to discriminate whether a calculated absolute angle of a steering shaft falls in an abnormal value even in cases where a combination between gear teeth of detection gears lies in the other area than a particular combination. Further, it is a second object of the present invention to provide a rotation angle sensor that is able to discriminate whether an absolute angle of a steering shaft, calculated when the rotation angle sensor is powered on, falls in an abnormal value, without rendering the steering shaft operative.

To achieve the above objects, the present invention, defined in an appended claim, provides a rotation angle sensor comprising first and second detection gears rotatable with a steering shaft, first detector for detecting a rotation angle of the first detection gear, first detector for detecting a rotation angle of the second detection gear, processor for computing a rotation angle of the steering shaft based on the rotation angles detected by the first and second detectors, and discriminator for discriminating whether the rotational angle of the steering shaft, calculated by the processor, falls in an abnormal value, wherein a least common multiple between a cycle of the first detector and a cycle of the second detector is greater than a steering angle measurement range.

The present invention, defined in the appended claim, mainly has advantageous effects described below. That is, cycles of the first and second detectors depend on the gear teeth of the first and second detection gears. Consequently, the present invention makes it possible to discriminate whether the rotational angle of the steering shaft falls in the abnormal value as far as the gear teeth of the first and second detection gears satisfy a condition that "a least common multiple between a cycle of the first detector and a cycle of the second detector is greater than a steering angle measurement range". Therefore, not only in a case where the gear teeth of the first and second detection gears fall in gear teeth disclosed in the described-above related art but also in a case where the gear teeth of the first and second detection gears fall in the other range than the gear teeth disclosed in the described-above related art, discrimination can be made to find whether the rotation angle of the steering shaft falls in the abnormal value.

Further, upon setting such that a second reference angular difference satisfies a formula (27-1) set forth below, the present invention makes it possible to discriminate whether the absolute angle of the steering shaft, calculated when the rotation angle sensor is powered on, falls in the abnormal value without rendering the steering shaft operative.

BRIEF DESCRIPTION OF THE DRAWINGS

FIG. 17 is a characteristic view illustrating the relationship between a cycle-value absolute angle and the actual absolute angle of the steering shaft.

FIG. 18 is a characteristic view illustrating the relationship between another cycle-value absolute angle and the actual absolute angle of the steering shaft.

DETAILED DESCRIPTION OF EMBODIMENTS (First Embodiment)

Now, a first embodiment according to the present invention is described below with reference to the accompanying drawings. First, reference is made to FIGS. 2 to 8 to describe a structure of a rotation angle sensor 1 of the first embodiment and principal functions of respective component parts. Also, throughout the following description, an absolute angle of a steering shaft is zeroed when the steering shaft remains in a neutral condition.

Figure 1:
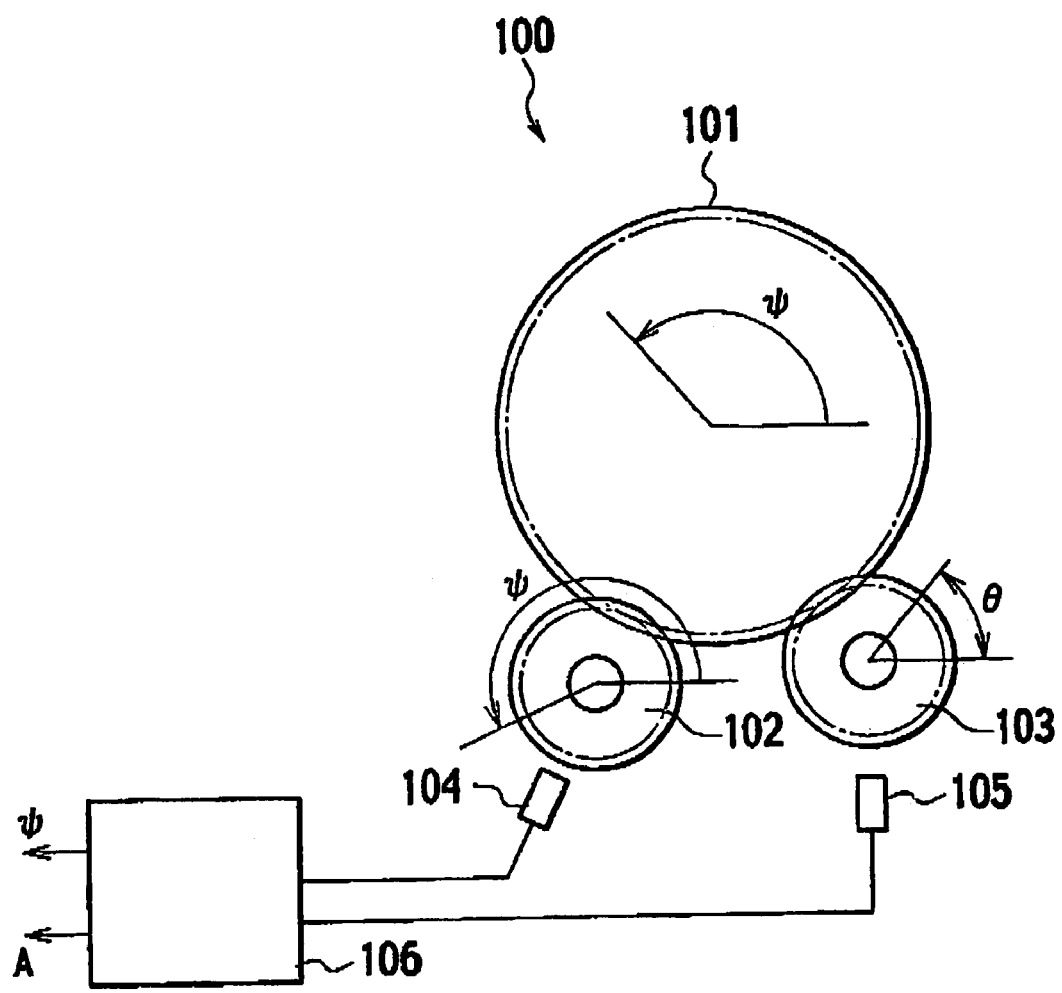
FIG. 1 is a plan view showing a rotation angle sensor in the related art.
Figure 2:
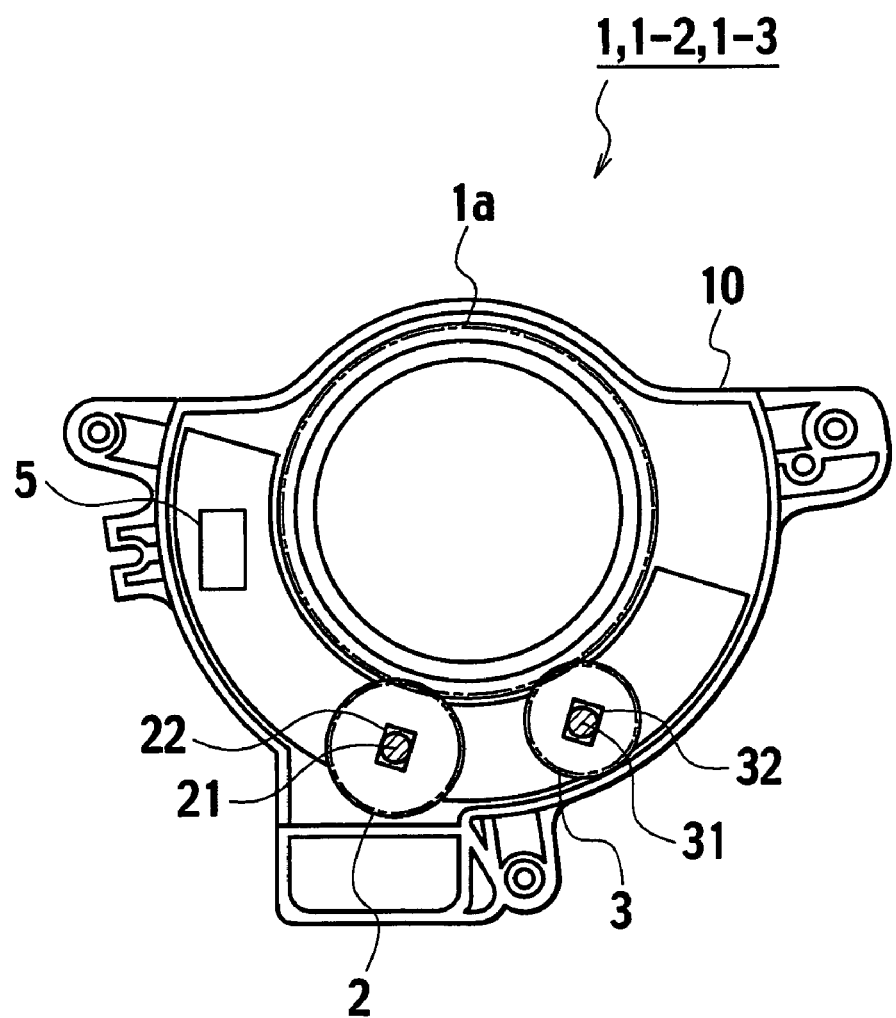
FIG. 2 is a plan view showing a rotation angle sensor of a first embodiment according to the present invention.
Figure 3:
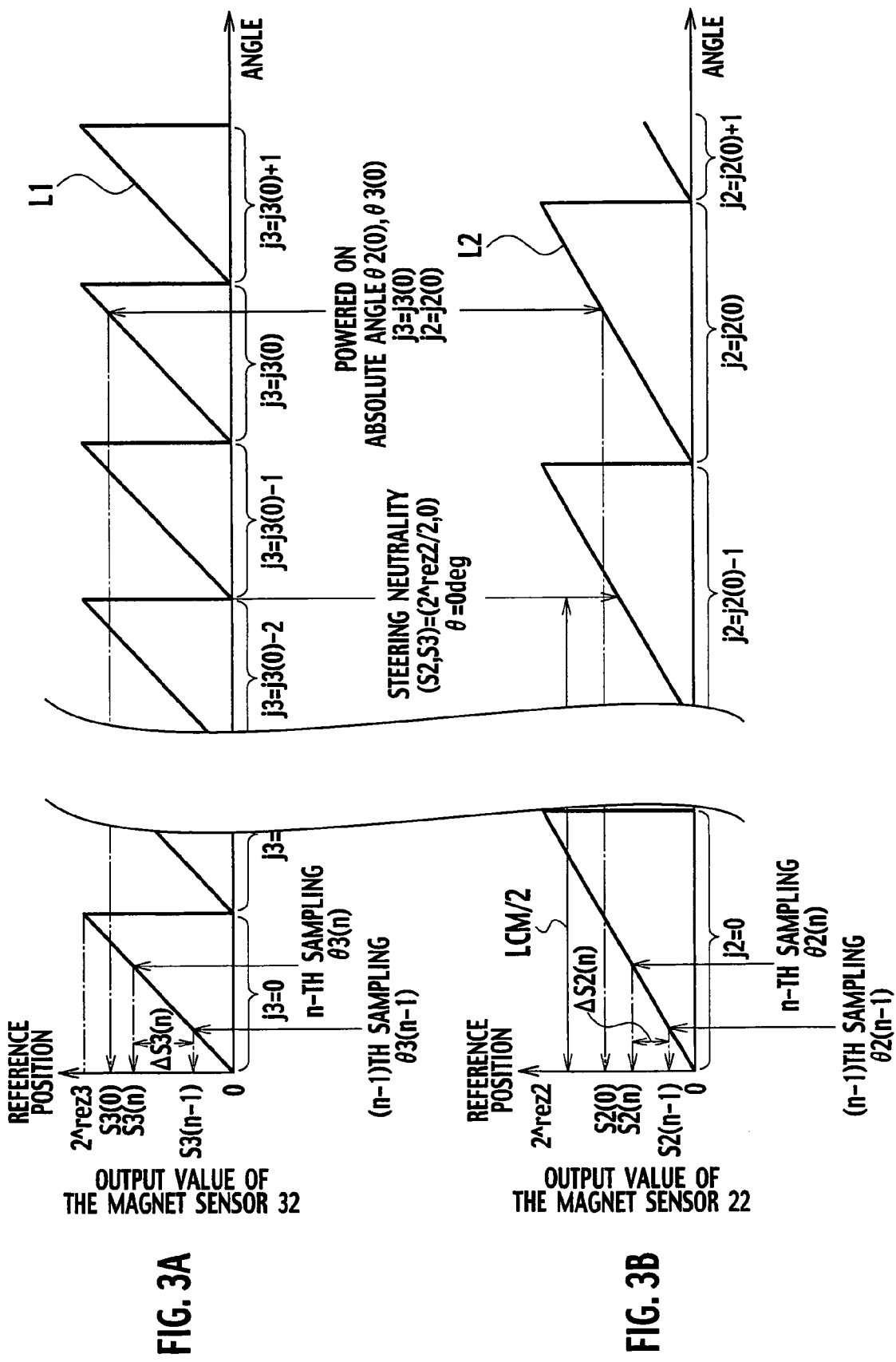
FIG. 3A is a characteristic view illustrating the relationship between a value of a digital signal outputted from a magnet sensor and an actual absolute angle of the steering shaft.
FIG. 3B is a characteristic view illustrating the relationship between a value of a digital signal outputted from a magnet sensor and an actual absolute angle of the steering shaft.

FIG. 2 is a plan view showing the rotational angle sensor 1. As shown in FIG. 2, the rotation angle sensor 1, which is accommodated in a case 10, is comprised of detection gears 2, 3, a magnet 21, a magnet (second magnet) 31, magnetic sensor (first detector) 22, a magnet sensor (second detector) 32 and a processor (processor and discriminator) 5.

A main gear 1a integrally rotates with a steering shaft. The detection gear 3 rotates with the main gear 1a and has a radius smaller than that of the main gear 1a. Consequently, the detection gear 3 rotates at a rotational speed higher than the main gear 1a.

The magnet 31 includes a magnet, magnetized in two poles, which is disposed at a rotational center of the detection gear 3 and rotates with the detection gear 3.

FIG. 3A is a view for illustrating a graph L1, indicative of the relationship between an actual absolute angle of a steering shaft and a value S3 of a digital signal outputted from the magnet sensor 32, which is plotted on a plane wherein the abscissa indicates the actual absolute angle of the steering shaft and the coordinate indicates the value S3 of the digital signal.

As shown in FIGS. 2 and 3A, the magnet sensor 32 is disposed in a vicinity of the magnet 31 to detect a direction of magnetic fluxes of the magnet 31, that is, an absolute angle of the detection gear 3 throughout angles of 0 to 360 [deg] in terms of a counterclockwise direction serving as a positive direction. Additionally, the magnet sensor 32 generates a digital signal, at a rate of rez3 bits (the term "rez3" represents a resolution of the magnet sensor 32 and, for instance, takes an integral number from 6 to 10) corresponding to the detected absolute angle, which is outputted to the processor 5 when applied with a selection signal and clock pulses from the processor 5. Further, the digital signal, read out by the processor 5 when executing cycle-value absolute angle calculating operation, which will be described later, takes a value of S3 (0). Also, the digital signal, which is read out by the processor 5 at an n-th number (n: integral number greater than 1) of times during count absolute-angle calculating operation, takes a value of S3 (n). As used herein, the term "neutral condition" refers to a status of the steering shaft under which a vehicle is traveling straight.

Furthermore, the magnet sensor 32 detects the magnitude of the magnetic fluxes of the magnet 31, that is, a magnetic intensity thereof and, under a situation where the detected magnetic intensity exceeds a given intensity range, generates a magnetic-intensity abnormal-value signal, when applied with the selection signal and the clock pulses, which is outputted together with the digital signal to the processor 5. Also, examples of cases wherein the magnetic intensity of the magnet 31 exceeds the given intensity range may be considered to include a case wherein the magnet 31 drops off or a distance between the magnet 31 and the magnet sensor 32 becomes extremely shortened.

The detection gear 2, shown in FIG. 2, rotates with the main gear 1a and has a radius smaller than that of the main gear 1a but larger than that of the detection gear 3. Accordingly, the detection gear 2 rotates at a higher rotational speed than the main gear 1a but at a lower rotational speed than the detection gear 3. As a consequence, an acceleration ratio of the detection gear 3 is greater than that of the detection gear 2. As used herein, the term "acceleration ratios of the detection gears 2, 3" refers to ratios between a rotational speed of the main gear 1a and rotational speeds of the detection gears 2, 3. The greater the acceleration ratios of the detection gears 2, 3, the higher will be the rotational speeds of the detection gears 2, 3 with respect to the main gear 1a.

The magnet 21, which includes a magnet that is magnetized in two poles, is disposed at a rotational center of the detection gear 2 and rotates with the detection gear 2.

FIG. 3B is a view for illustrating a graph L2, indicative of the relationship between an actual absolute angle of a steering shaft and a value S2 of a digital signal outputted from the magnet sensor 22, which is plotted on a plane wherein the abscissa indicates the actual absolute angle of the steering shaft and the coordinate indicates the value S2 of the digital signal.

As shown in FIGS. 2 and 3B, the magnet sensor 22 is disposed in a vicinity of the magnet 21 to detect a direction of magnetic fluxes of the magnet 21, that is, an absolute angle of the detection gear 2 throughout angles of 0 to 360 [deg] in terms of a counterclockwise direction serving as a positive direction. Additionally, the magnet sensor 22 generates a digital signal, at a rate of rez2 bits (the term "rez2" represents a resolution of the magnet sensor 22 and, for instance, takes an integral number from 6 to 10) corresponding to the detected absolute angle, which is outputted to the processor 5 when applied with the selection signal and clock pulses from the processor 5. Further, the digital signal, read out by the processor 5 when executing cycle-value absolute angle calculating operation, which will be described later, takes a value of S2 (0). Also, the digital signal, which is read out by the processor 5 at an n-th number of times during count absolute-angle calculating operation, takes a value of S2 (n).

Furthermore, the magnet sensor 22 detects the magnitude of the magnetic fluxes of the magnet 21, that is, the magnetic intensity thereof and, under a situation where the detected magnetic intensity exceeds a given intensity range, generates a magnetic-intensity abnormal-value signal, when applied with the selection signal and the clock pulses, which is outputted together with the digital signal to the processor 5. Also, examples of cases wherein the magnetic intensity of the magnet 31 exceeds the given intensity range may be considered to include a case wherein the magnet 21 drops off or a distance between the magnet 21 and the magnet sensor 22 becomes extremely shortened.

Moreover, a least common multiple LCM between a cycle c3 of the magnet sensor 32 and a cycle c2 of the magnet sensor 22 takes a value that exceeds a value greater than a steering angle measurement range. As used herein, the term "steering angle measurement range" refers to a range that, among the rotational angles of the steering shaft, forms an object whose absolute angle is calculated by the rotation angle sensor 1.

In particular, the LCM satisfies a formula (0) described below. Also, the steering angle measurement range falls in a value ranging from $-\alpha$ (deg) to $+\alpha$ (deg).

$$LCM \geq 2\alpha \qquad (0)$$

As used herein, the term "a cycle c3 of the magnet sensor 32" refers to an angle at which the steering shaft rotates during one revolution of the detection gear 3 and the term "a c2 of the magnet sensor 22" refers to an angle at which the steering shaft rotates during one revolution of the detection gear 2. In particular, the cycles c2, c3 are expressed by the formulae (1) and (2), where m represents a gear teeth of the main gear 1a, n2 represents a gear teeth of the detection gear 2 and n3 represents a gear teeth of the detection gear 3.

$$c2 = 360 * n2/m \qquad (1)$$

$$c3 = 360 * n3/m \qquad (2)$$

Since a set of values S2, S3 of the digital signals are uniquely determined within a range of the least common multiple LCM, if this condition is satisfied, the set of the values S2, S3 of the digital signals are uniquely determined within the steering angle measurement range as shown in FIGS. 3A and 3B.

Further, the values S2, S3 of the digital signals are zeroed when the actual absolute angle of the steering angle becomes less than the minimum value of the steering angle measurement range.

Furthermore, the magnet sensors 22, 32 are adjusted such that under circumstances where the steering shaft assumes the neutral position, the cycle-value absolute angle and the count absolute angle become zeroed.

Now, the processor 5 executes the operations described below.

[Cycle-Value Absolute Angle Calculating Operation]

The processor 5 generates selection signals and clock signals, when the rotation angle sensor 1 is powered on, which in turn are outputted to the magnet sensors 22, 32. Then, digital signals, delivered from the magnet sensors 22, 32 depending on these outputs, are read in and, as shown in FIGS. 3A and 3B, cycle values j2 (0) and j3 (0) delivered from the magnet sensors 22, 32 at this moment are calculated.

Here, the cycle value j2 represents the number of rotations of the detection gear 2 and takes a reference value (i.e., at zero) when the actual absolute angle of the steering shaft becomes less than the minimum value of the steering angle measurement range.

Further, the cycle value j3 represents the number of rotations of the detection gear 3 and takes a reference value (i.e., at zero) when the actual absolute angle of the steering shaft becomes less than the minimum value of the steering angle measurement range.

Furthermore, the cycle values j2 and j3, to be calculated in the cycle-value absolute angle calculating operation, take values of j2 (0) and j3 (0), respectively, and the cycle values j2 and j3, at an n-th sampling timing in the cycle-value absolute angle calculating operation, take values of j2 (n) and j3 (n), respectively.

As set forth above, a set of the value S3 (0) of the digital signal and the value S2 (0) of the digital signal are uniquely determined and, so, the processor 5 is able to calculate the cycle values j2 (0), j3 (0) based on the digital signals delivered from the magnet sensors 22 and 32.

In particular, the processor 5 executes the following operations to calculate the cyclic vales j2 (0), j3 (0) and the cycle-value absolute angles θ 2 (0), θ 3 (0). That is, the processor 5 calculates cycle-value judgment widths MARKrevo2, MARKrevo3 by substituting the values S2 (0), S3 (0) of the digital signals to S2, S3 of the following formulae (3) to (10), respectively.

Here, m represents the gear teeth of the mina gear 1a, n2 represents the gear teeth of the detection gear 2 and n3 represents the gear teeth of the detection gar 3. Also, Δ t2 represents a cycle-value judgment width related to the magnet sensor 22, that is, a range of the MARKrevo2, which one cycle value j2 is able to take, and t3 represents a cycle-value judgment width related to the magnet sensor 32, that is, a range of the MARKrevo3 which one cycle value j3 is able to take. Also, x2 represents the number of cycles of the magnet sensor 22 and x3 represents the number of cycles of the magnet sensor 32. As used herein, the term "the number x2 of cycles" refers to the number of times in which the detection gear 2 rotates within the least common multiple LCM.

$$\text{MARK}revo2 = \text{Residue of } \{(S2*i3/i2 - S3 + a2)/2^{rez2}\} \quad (3)$$

$$\text{MARK}revo3 = \text{Residue of } \{(S3*i2/i3 - S2 + a3)/2^{rez3}\} \quad (4)$$

$$i2 = m/n2 \quad (5)$$

$$i3 = m/n3 \quad (6)$$

$$a2 = \Delta t2/2 = 2^{rez}/x2/2 \quad (7)$$

$$a3 = \Delta t3/2 = 2^{rez}/x3/2 \quad (8)$$

$$x2 = LCM/c2 \quad (9)$$

$$x3 = LCM/c3 \quad (10)$$

Then, the processor 5 calculates the cycle values j2 (0), j3 (0) based on the cycle-value judgment widths MARKrevo2, MARKrevo3.

Now, reference is made to describe why the cycle value j2 (0) can be calculated based on the cycle-value judgment widths MARKrevo2. That is, in the formula (3), by {(S2*i3/i2−S3) is meant that as shown in FIG. 3A, an inclination of the graph L2 is shifted to an inclination of the graph L1 to form a graph L2' and the value S3 of the digital signal is subtracted from a value S2' (=S2*i3/i2) of a digital signal designated by the graph L2'. In the meanwhile, since the set of the S3 of the digital signal and the value S2 of the digital signal are uniformly determined within the steering angle measurement range, a positional relationship between the graph L1 and the graph L2' differs from one another depending on the cycle value j2.

Accordingly, a value of {(S2*i3/i2−S3} is uniquely determined in accordance with the cycle value j2, the cycle-value judgment width MARKrevo2 is uniquely determined in accordance with the cycle value j2.

Therefore, the processor 5 is able to calculate the cycle value j2 (0) based on the cycle-value judgment width MARKrevo2. For the same reason, the processor 5 is able to calculate the cycle value j3 (0) based on the cycle-value judgment width MARKrevo3.

Now, examples of the cycle-value judgment widths MARKrevo2 and MARKrevo3 are described with reference to FIGS. 4 to 7. Also, in case of FIGS. 4 to 7, the relationships stand for m=135, n2=48, n3=34 and rez2=rez3=10 (bit).

Figure 4:
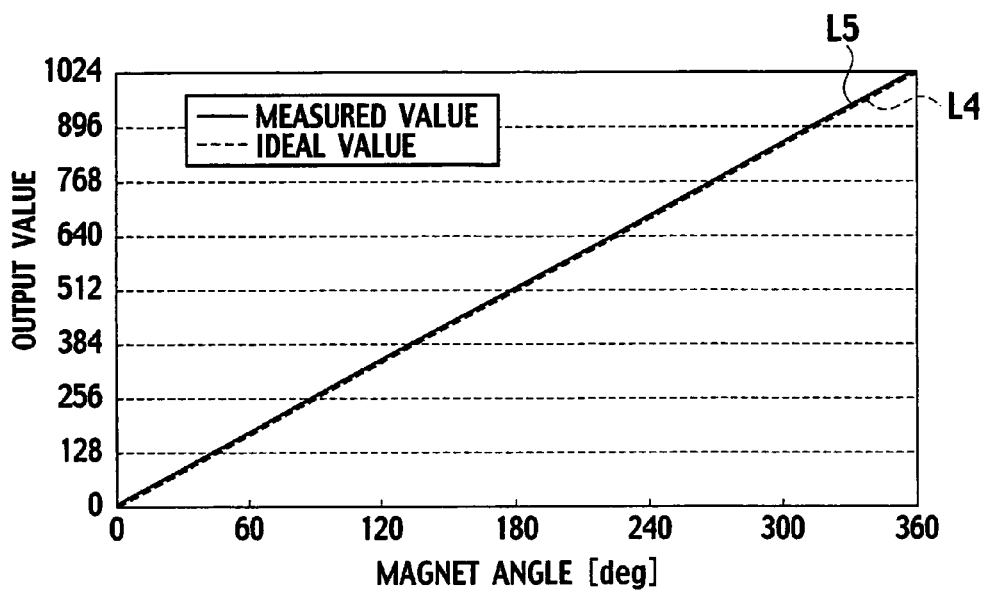
FIG. 4 is a characteristic view illustrating the relationship between a value of a digital signal outputted from a magnet sensor and an actual absolute angle of a detection gear.
Figure 5:
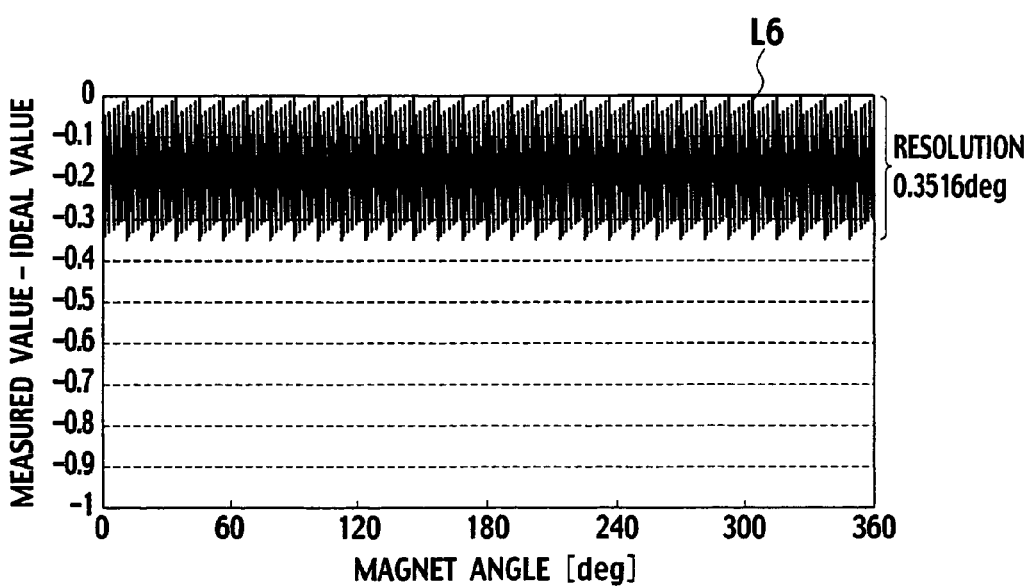
FIG. 5 is a characteristic view illustrating the relationship between an error in a value of a digital signal, outputted from a magnet sensor, and an actual absolute angle of a detection gear.
Figure 6:
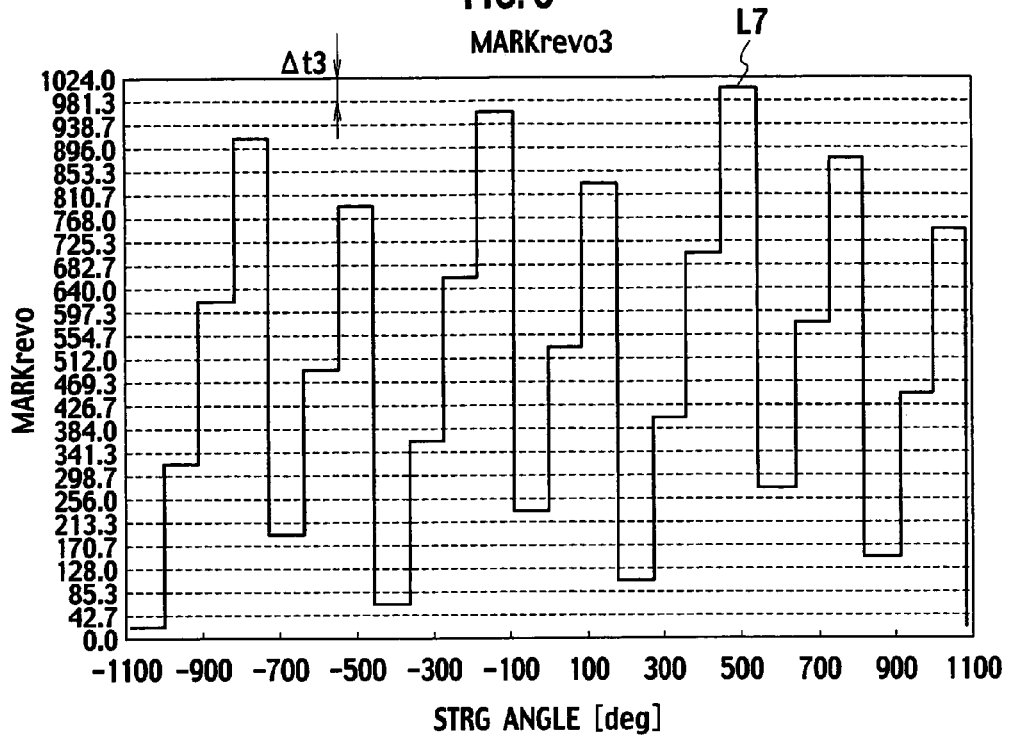
FIG. 6 is a characteristic view illustrating the relationship between a cycle-value judgment width and an actual absolute angle of the steering shaft.
Figure 7:
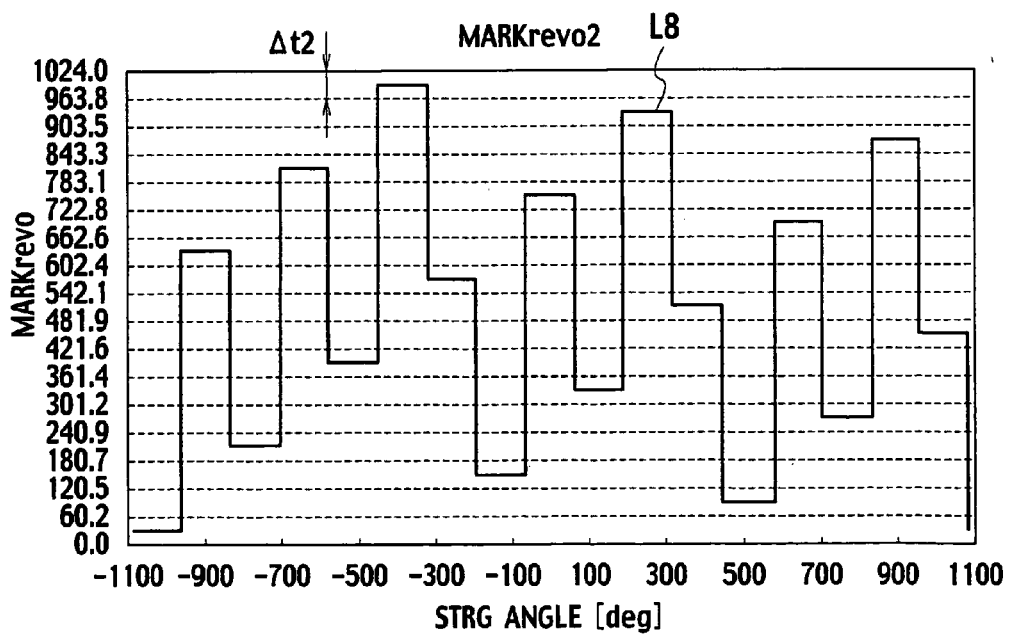
FIG. 7 is a characteristic view illustrating the relationship between the cycle-value judgment width and the actual absolute angle of the steering shaft.

FIG. 4 is a view showing a graph L4, indicative of the relationship between the actual absolute angles of the detection gears 2, 3 and ideal values of the digital signals S2, S3, and a graph L5, indicative of the relationship between the actual absolute angles of the detection gears 2, 3 and actually measured values of the digital signals S2, S3, which are plotted on planes wherein the abscissa designates the actual absolute angles of the detection gears 2, 3 and the coordinate designates the digital signals S2, S3. FIG. 5 is a view showing a graph L6, indicative of the relationship between the actual absolute angles of the detection gears 2, 3 and an error (=(Actually Measured Value)−(Ideal Value) of the values S2, S3 of the digital signals, which is plotted on a plane in which the abscissa designates the actual absolute angles of the detection gears 2, 3 and the coordinate designates the errors of the values S2, S3 of the digital signals. FIG. 6 is a graph showing a graph L7, indicative of the relationship between the actual absolute angle of the steering shaft and the cycle-value judgment width MARKrevo3, which is plotted on a plane in which the abscissa designates the actual absolute angle of the steering shaft and the coordinate designates the cycle-value judgment width MARKrevo3. FIG. 7 is a graph showing a graph L8, indicative of the relationship between the actual absolute angle of the steering shaft and the cycle-value judgment width MARKrevo2, which is plotted on a plane in which the abscissa designates the actual absolute angle of the steering shaft and the coordinate designates the cycle-value judgment width MARKrevo2.

As shown in FIGS. 4 and 5, with the digital signals having the values S2, S3 whose actually measured values are ideal, the relevant actually measured values are substantially coincident with the ideal values and the errors of the values S2, S3 of the digital signals include only errors (=360 (deg)/10 (bit)=0.3516 (deg) resulting from resolutions of the magnet sensors 22, 32. In this case, the cycle-value judgment width MARKrevo3 varies as shown in FIG. 6 and the cycle-value judgment width MARKrevo2 varies as shown in FIG. 7.

As shown in FIGS. 6 and 7, the cycle-value judgment widths MARKrevo2 and MARKrevo3 are uniquely determined for the cycle values j2, j3 within the steering angle measured range.

In particular, the graph L7, shown in FIG. 6, has 24 pieces (=x3) of cycle-value judgment sections (sections which are substantially horizontal in graph L7). These cycle-value judgment sections corresponds to the cycle value j3=0, 1, 2, 3, . . . 23 in order from a left end of the cycle-value judgment sections in FIG. 6. Also, among divided ranges obtained upon dividing a range (=0 to 2^rez3), which the value S3 of the digital signal can take, into 24 (=x3) pieces, the cycle-value judgment width MARKrevo3 of each cycle-value judgment section has a value in the divided ranges that are mutually different from one another. Here, each divided range has a width of Δ t3. For instance, the cycle-value judgment width MARKrevo3, corresponding to j3=4, takes a value falling in the divided range from 170.7 to 213.3.

Similarly, the graph L8, shown in FIG. 7, has 17 pieces (=x2) of cycle-value judgment sections (sections which are substantially horizontal in the graph L8). These cycle-value judgment sections corresponds to the cycle value j2=0, 1, 2, 3, . . . 16 in order from a left end of the cycle-value judgment sections in FIG. 7. Also, among divided ranges obtained by dividing a range (=0 to 2^rez2), which the value S2 of the digital signal can take, into 17 (=x2) pieces, the cycle-value judgment width MARKrevo2 of each cycle-value judgment section has a value involved in divided ranges that are mutually different from one another. Here, each divided range has a width of Δ t2. Accordingly, the cycle-value judgment widths MARKrevo2 and MARKrevo3 are uniquely determined for the cycle values j2, j3 within the steering angle measurement range.

Upon calculating the cycle values j2 (0), j3 (0) in such a way, the processor 5 calculates the cycle-value absolute angles θ 2 (0), θ 3 (0) of the steering shaft using formulae described below based on the calculated cycle values j2 (0), j3 (0).

$$\theta 2(0)=S2(0)*360*n2/2\hat{\ }rez2/m+j2(0)*360*n2/m-\theta \text{ offset} \quad (11)$$

$$\theta 3(0)=S3(0)*360*n3/2\hat{\ }rez3/m+j3(0)*360*n3/m-\theta \text{ offset} \quad (12)$$

$$\theta \text{ offset}=LCM/2 \quad (13)$$

Here, as set forth above, the cycle values j2 (0), j3 (0) are calculated based on the values S2, S3 of the digital signals outputted from the magnet sensors 22, 23. Accordingly, by the term "the cycle-value absolute angle" is meant the absolute angle of the steering shaft calculated on the basis of the values S2, S3 of the digital signals outputted from the magnet sensors 22, 23.

Then, the processor 5 generates cycle-value absolute angle signals, related to the calculated cycle-value absolute angles θ 2 (0), θ 3 (0), which are outputted to a higher rank system on a vehicle.

[Count Absolute-Angle Calculating Operation]

Upon executing the cycle-value absolute angle calculating operation several times, the processor 5 generates selection signals and clock signals at a given n-th sampling timing that are outputted to the magnet sensors 22, 32. Then, the processor 5 reads the digital signals, delivered from the magnet sensors 22, 32, depending on the relevant outputs and calculates the cycle values j2 (n), j3 (n) of the magnet sensors 22, 32 at the given n-th sampling timing (that is, at a current sampling timing) on the basis of the digital signals that are read in, the digital signals that has been read in a preceding calculation, and the cycle values j2 (n−1), j3 (n−1) calculated in the preceding calculation. Further, the processor 5 calculates the current count absolute angles θ 2 (n), θ 3 (n) of the steering shaft based on the relevant digital signals that are currently read, and the calculated cycle values j2 (n), j3 (n).

More particularly, as shown in FIG. 3A, the processor 5 calculates a difference Δ S3 (n) between the value S3 (n) of the digital signal, which is currently read, and the value S3 (n−1) of the digital signal that is read in the preceding operation. Likewise, as shown in FIG. 3B, the processor 5 calculates a difference Δ S2 (n) between the value S2 (n) of the digital signal, which is currently read, and the value S2 (n−1) of the digital signal that is read in the preceding operation. Then, depending on the calculated differences Δ S2 (n) and Δ S3 (n), the processor 5 calculates current cycle values j2 (n), j3 (n) using formulae (14) to (19) that are described below. In particular, if the difference Δ S2 (n) satisfies the formula (14), the processor 5 calculates the current cycle value j2 (n) to have a value equal to the preceding cycle value j2 (n−1) and if the difference Δ S2 (n) satisfies the formula (15), the processor 5 calculates the current cycle value j2 (n) to have a value less than the preceding cycle value j2 (n−1) by 1. Also, if the difference Δ S2 (n) satisfies the formula (16), the processor 5 calculates the current cycle value j2 (n) to have a value greater than the preceding cycle value j2 (n−1) by 1.

$$|\Delta S2(n)| \leq Sx2 \quad (14)$$

$$\Delta S2(n) > Sx2 \quad (15)$$

$$\Delta S2(n) < -Sx2 \quad (16)$$

Similarly, in a case where the difference Δ S3 (n) satisfies the formula (17), the processor 5 calculates the current cycle value j3 (n) to have a value equal to the preceding cycle value j3 (n−1) and if the difference Δ S3 (n) satisfies the formula (18), the processor 5 calculates the current cycle value j3 (n) to have a value less than the preceding cycle value j3 (n−1) by 1. Also, if the difference Δ S3 (n) satisfies the formula (19), the processor 5 calculates the current cycle value j3 (n) to have a value greater than the preceding cycle value j3 (n−1) by 1.

$$|\Delta S3(n)| \leq Sx3 \quad (17)$$

$$\Delta S3(n) > Sx3 \quad (18)$$

$$\Delta S3(n) < -Sx3 \quad (19)$$

where Sx2 and Sx3 represent constants that satisfy formulae (20) and (21) expressed below.

$$Sx2 < 2\hat{\ }rez2/2 \quad (20)$$

$$Sx3 < 2\hat{\ }rez3/2 \quad (21)$$

Figure 8:
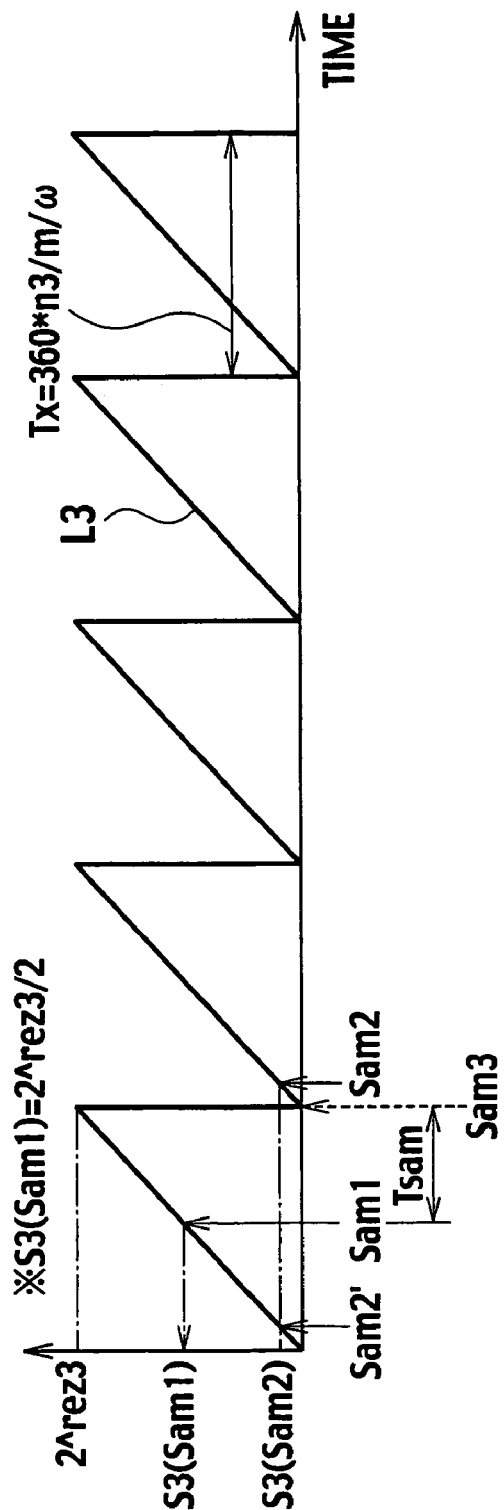
FIG. 8 is a characteristic view illustrating the relationship between a value of the digital signal, outputted from the magnet sensor, and time.

Here, description is made of a method of setting a sampling time interval with reference to FIG. 8. FIG. 8 is a view showing the graph L3, indicative of the relationship between time and the value S3 (T) of the digital signal outputted from the magnet sensor 32, which is plotted on a plane in which the abscissa designates time and the coordinate designates the value S3 (T) of the digital signal outputted from the magnet sensor 32. In FIG. 8, by the term "time Tx" is meant the shortest time interval required for the detection gear 3 to rotate with in a given rotation range (i.e., a rotation range, for which the magnet sensor 3 is able to detect, and which takes a value of 360 (deg) in the first embodiment and second and third embodiments which will be described later).

As shown in FIG. 8, in cases where the processor 5 reads only the digital signal, outputted from the magnet sensor 32, and where the value S3 (Sam1) of the digital signal at the concurrent sampling timing Sam1 lies at a value of 2^rez3/2, difficulties are apt to occur in distinguishing whether, when a sampling time interval Tsam3 is longer than a half of the time Tx, the value S3 (Sam2) of the digital signal, generated at a subsequent sampling timing Sam2, is a value obtained at the sampling timing Sam2' or a value obtained at the sampling timing Sam2.

Stated another way, a probability is apt to occur with difficulties in distinguishing whether the cycle value j3 (Sam2) at a subsequent sampling timing Sam2 is identical to the cycle value j3 (Sam1) at a current sampling timing Sam1.

Accordingly, in order to accurately calculate the cycle value j3 at a certain sampling timing, a need arises for the sampling time interval Tsam3 to satisfy a formula (22) described below. In the formula (22), ω designates the maximum angular velocity of the steering shaft and a value indicated at the rightmost side is a half of the time Tx.

$$TSam3 < Sam3 - Sam1 = 360*n3/m/2/\omega \qquad (22)$$

In cases where the processor 5 reads only the digital signal, outputted from the magnet sensor 22, in a similar concept, the sampling time interval Tsam2 needs to satisfy a formula (23) expressed below.

$$TSam2 < 360*n2/m/2/\omega \qquad (23)$$

With the presently filed embodiment, since the processor 5 calculates the cycle values j2 (n), j3 (n) upon reading the digital signals outputted both from the magnet sensors 22, 32, the sampling time interval Tsam is set to satisfy a formula (24) expressed below.

$$\text{Tsam} < (\text{a small value between Tsam2 and Tsam3}) \qquad (24)$$

The processor 5 calculates the count absolute angles θ 2 (n), θ 3 (n) using formulae (25) and (26) based on the cycle values j2 (n), j3 (n), calculated in the above-described operation, and the values S2 (n), S3 (n) of the digital signals read out in current operation. Then, the processor 5 generates count absolute-angle signals, associated with the calculated count absolute-angle signals θ 2 (n), θ 3 (n), which in turn is outputted to the upper rank system on the vehicle.

$$\theta 2(n) = S2(n)*360*n2/2\hat{}rez2/m + j2(n)*360*n2/m - \theta\text{offset} \qquad (25)$$

$$\theta 3(n) = S3(n)*360*n3/2\hat{}rez3/m + j3(n)*360*n3/m - \theta\text{offset} \qquad (26)$$

Here, as shown in the formulae (14) to (26), the count absolute angle θ 2 (n) represents an absolute angle of the steering shaft calculated based on the cycle value j2 (n−1), calculated in preceding operation, and the values S2 (n−1) and S2 (n) of the digital signals generated in preceding and current operations. Likewise, the count absolute angle θ 3 (n) represents an absolute angle of the steering shaft calculated based on the cycle value j3 (n−1) calculated in preceding operation and the values S3 (n−1) and S3 (n) of the digital signals generated in preceding and current operations.

Further, the processor 5 executes first to fourth fail-safe operations in a manner described below.

[First Fail-Safe Operation]

In cases where the processor 5 is applied with a magnet-intensity abnormal-value signal from at least one of the magnet sensors 22, 32 when the selection signals and clock signals are applied to the magnet sensors 22, 32 from the processor 5, discrimination is made that the cycle-value absolute angles θ 2 (0), θ 3 (0) and the count absolute angles θ 2 (n), θ 3 (n), which are calculated, are abnormal values.

The reason why such judgment is made resides in a fact that if the magnet intensity exceeds a given intensity range, the magnet sensors 2, 3 encounter difficulties in accurately calculating the absolute angles of the detection gears 2, 3 and it becomes hard for the processor 5 to accurately calculate the cycle-value absolute angles θ 2 (0), θ 3 (0) and the count absolute angles θ 2 (n), θ 3 (n).

[Second Fail-Safe Operation]

The processor calculates the angular difference Δ θ between the count absolute angles θ 2 (n) and the count absolute angles θ 3 (n).

Then, under situations where the calculated angular difference Δ θ and a reference angular difference Δ Θ satisfy a formula (29) expressed below, that is, when the angular difference Δ θ exceeds the reference angular difference Δ Θ, the processor 5 discriminates that the cycle-value absolute angles θ 2 (0), θ 3 (0) and the count absolute angles θ 2 (n), θ 3 (n) are abnormal values. Here, the reference angular difference Δ Θ is expressed by a formula (27) or a formula (28) indicated below.

$$\Delta\Theta = c2/x3/2 \qquad (27)$$

$$\Delta\Theta = c3/x2/2 \qquad (28)$$

$$|\Delta\Theta| > \Delta\Theta \qquad (29)$$

Here, the reason why the processor 5 is able to make the above-described discrimination comes from the reasons described below. That is, in cases where the count absolute angles θ 2 (n), θ 3 (n) are accurately calculated, the count absolute angles θ 2 (n) and the count absolute angles θ 3 (n) are coincident and, so, a set of cycle values j2, j3, calculated from the values S2 (n), S3 (n) of the digital signals, and a set of cycle values j2, j3, used for calculating the count absolute angles θ 2 (n), θ 3 (n), become coincident.

Here, if the angular difference Δ Θ satisfies the formula (29), the set of cycle values j2, j3, calculated from the values S2 (n), S3 (n) of the digital signals, and the set of cycle values j2, j3, used for calculating the count absolute angles θ 2 (n), θ 3 (n), are not coincident. Then, it can be said that if the sets of these cycle values j2, j3 are not coincident, the count absolute angles θ 2 (n), θ 3 (n) are not coincident. From the above operations, the processor 5 can make the above-described judgment.

Here, by setting such that reference angular difference Δ Θ satisfies a formula (27-1) expressed below, it becomes possible for the processor 5 to make judgment whether the cycle-value absolute angles θ 2 (0), θ 3 (0) and the count absolute angles θ 2 (n), θ 3 (n) fall in abnormal values before the cycle-value absolute angles θ 2 (0), θ 3 (0) and the count absolute angles θ 2 (n), θ 3 (n) actually fall in the abnormal values.

$$\Delta\Theta < c2/x3/2 \qquad (27\text{-}1)$$

For instance, even when the cycle-value absolute angles θ 2 (0), θ 3 (0) and the count absolute angles θ 2 (n), θ 3 (n), calculated when the rotation angle sensor 1 is powered on, remain in normal values, if in this moment the formula (29) is satisfied, the processor 5 is able to discriminate that the cycle-value absolute angles θ 2 (0), θ 3 (0) and the count absolute angles θ 2 (n), θ 3 (n) fall in the abnormal values. Therefore, the processor 5 is possible to make discrimination, before a steering wheel is actuated, whether the cycle-value absolute angles θ 2 (0), θ 3 (0) and the count absolute angles θ 2 (n), θ 3 (n), calculated when the rotation angle sensor 1 is powered on, fall in the abnormal values.

[Third Fail-Safe Operation]

Under circumstances where the cycle-value absolute angles θ 2 (0), θ 3 (0) and the count absolute angles θ 2 (n), θ 3 (n), which are calculated, satisfy any of formulae (30) to (33) indicated below, the processor 5 discriminates that the cycle-value absolute angles θ 2 (0), θ 3 (0) and the count absolute angles θ 2 (n), θ 3 (n), which are calculated, fall in the abnormal values.

$$|\theta 2(0)| > \alpha \quad (30)$$

$$|\theta 3(0)| > \alpha \quad (31)$$

$$|\theta 2(n)| > \alpha \quad (32)$$

$$|\theta 3(n)| > \alpha \quad (33)$$

Also, the processor 5 is able to make the above-described discrimination because of reasons described below. That is, as described above, the processor 5 uniquely calculates the actual absolute angle of the steering shaft, within the steering angle measurement range, as the cycle-value absolute angle θ 2 (n), θ 3 (n) and the count absolute angles θ 2 (n), θ 3 (n). Accordingly, under normal operations, the cycle-value absolute angles θ 2 (0), θ 3 (0) and the count absolute angles θ 2 (n), θ 3 (n) do not exceed the steering angle measurement range. Consequently, the processor 5 is able to make the above-described discrimination.

[Fourth Fail-Safe Operation]

The processor 5 calculates angular velocities ω 21, ω 22, ω 31, ω 32, on the cycle-value absolute angles θ 2 (0), θ 3 (0) and the count absolute angles θ 2 (n), θ 3 (n), respectively, using formulae (34) to (37). Here, θ 2' (0) represents a cycle-value absolute angle calculated in a preceding operation using the formula (11) and θ '3 (0) represents a cycle-value absolute angle calculated in a preceding operation using the formula (12).

$$\omega 21 = |\theta 2(0) - \theta 2'(0)|/Tsam \quad (34)$$

$$\omega 31 = |\theta 3(0) - \theta 3'(0)|/Tsam \quad (35)$$

$$\omega 22 = |\theta 2(n) - \theta 2(n-1)|/Tsam \quad (36)$$

$$\omega 32 = |\theta 3(n) - \theta 3(n-1)|/Tsam \quad (37)$$

Then, in cases where the angular velocities ω 21, ω 22, ω 31, ω 32 satisfy any of formulae (40) to (43) expressed below, the processor 5 discriminates that the cycle-value absolute angles θ 2 (0), θ 3 (0) and the count absolute angles θ 2 (n), θ 3 (n) fall in the absolute values. Here, in the formulae (40) to (43), reference angular velocities Ω 2, Ω 3 are expressed in formulae (38) and (39).

$$\Omega 2 = LCM/x2/Tsam \quad (38)$$

$$\Omega 3 = LCM/x3/Tsam \quad (39)$$

$$\omega 21 > \Omega 2 \quad (40)$$

$$\omega 22 > \Omega 2 \quad (41)$$

$$\omega 31 > \Omega 3 \quad (42)$$

$$\omega 32 > \Omega 3 \quad (43)$$

Also, under circumstances where the maximum angular velocity ω (see FIG. 8) of the steering shaft is set to be a reference angle and any one of the angular velocities ω 21, ω 22, ω 31, ω 32 exceeds the maximum angular velocity ω, the processor 5 may execute discrimination such that the cycle-value absolute angles θ 2 (0), θ 3 (0) and the count absolute angles θ 2 (n), θ 3 (n) fall in the absolute values. Also, the maximum angular velocity ω may be preferably smaller than a value of a smaller one of the reference angular velocities Ω 2, Ω 3.

Here, the processor 5 is able to execute the above-described discrimination for the reasons described below. In the formulae (38) and (39), LCM/x2 represents the cycle c2 and LCM/x3 represents the cycle c3. In the meanwhile, Tsam is shorter than the shortest time interval required for each of the detection gears 2, 3 to rotate one turn as expressed in the formulae (22) to (24). Accordingly, under normal conditions, no angular velocities ω 21, ω 22 exceed the reference angular velocity Ω 2. Similarly, no angular velocities ω 31, ω 32 exceed the reference angular velocity Ω 3. Further, since the maximum angular velocity ω is the maximum angular velocity of the steering shaft, none of the angular velocities ω 21, ω 22, ω 31, ω 32 exceeds the maximum angular velocity ω under the normal conditions. From the above reasons, the processor 5 is able to execute the above-described judgment.

If the processor 5 executes discrimination, upon the execution of the first to fourth fail-safe operations set forth above, that the cycle-value absolute angles θ 2 (0), θ 3 (0) fall in the abnormal values, then, abnormal-value signals are generated and outputted to the upper rank system on the vehicle. Likewise, when the cycle-value absolute angles θ 2 (n), θ 3 (n) are discriminated to fall in the abnormal values, the abnormal-value signals are generated and outputted to the upper rank system on the vehicle.

Now, a basic sequence of operations of the rotation angle sensor 1 is described with reference to flowcharts shown in FIGS. 9 to 10.

In step ST1, the rotation angle sensor 1 is powered on and in step ST2, the processor 5 outputs selection signals and clock signals to the magnet sensors 22, 32 at time when the rotation angle sensor 1 is powered on. Subsequently, when applied with the selection signals and clock signals, the magnet sensors 22, 32 generate digital signals, through the operations described above, which in turn are outputted to the processor 5. When this takes place, the magnet sensors 22, 32 detect magnet intensities of the magnets 21, 31 and when the detected magnet intensities are found to exceed a given intensity range, a magnet-intensity abnormal-value signal is generated and outputted together with the digital signals to the processor 5. Next, the processor 5 reads in the digital signals delivered from the magnet sensors 22, 32.

In consecutive step ST3, the processor 5 executes the first fail-safe operation set forth above. As a result, if discrimination is made that the cycle-value absolute angles θ 2 (0), θ 3 (0) and the count absolute angles θ 2 (n), θ 3 (n) fall in abnormal values, the processor 5 generates an abnormal-value signal that is outputted to an upper rank system on the vehicle.

In succeeding step ST4, the processor 5 executes the cycle-value absolute angle calculating operation based on the digital signals, read in step ST1, to calculate the cycle-value absolute angles θ 2 (0), θ 3 (0).

In subsequent step ST5, the processor 5 executes the third fail-safe operation set forth above based on the cycle-value absolute angles θ 2 (0), θ 3 (0) calculated in step ST4. As a result, if discrimination is made that the cycle-value absolute angles θ 2 (0), θ 3 (0) and the count absolute angles θ 2 (n), θ 3 (n) fall in abnormal values, the processor 5 generates the abnormal-value signal that is outputted to the upper rank system on the vehicle.

In succeeding step ST6, the processor 5 stores the cycle-value absolute angles θ 2 (0), θ 3 (0), calculated in step ST4, in a memory.

In next step ST7, the processor 5 outputs the selection signals and the clock signals to the magnet sensors 22, 32. Subsequently, when applied with the selection signals and clock signals, the magnet sensors 22, 32 generate digital signals, through the operations described above, which in turn are outputted to the processor 5. When this takes place, the magnet sensors 22, 32 detects magnet intensities of the magnets 21, 31 and when the detected magnet intensities exceed the given intensity range, the magnet-intensity abnormal-value signal is generated and outputted together with the digital signals to the processor 5. Next, the processor 5 reads the digital signals delivered from the magnet sensors 22, 32.

In consecutive step ST8, the processor 5 executes the first fail-safe operation set forth above. As a result, if discrimination is made that the cycle-value absolute angles θ 2 (0), Θ 3 (0) fall in the absolute values, the processor 5 generates the abnormal-value signal that is outputted to the upper rank system on the vehicle.

In succeeding step ST9, the processor 5 executes the cycle-value absolute angle calculating operation based on the digital signals, read in step ST7, to calculate the cycle-value absolute angles θ 2 (0), θ 3 (0).

In next step ST10, if no operations subsequent to step ST17 are executed, the processor 5 executes the above-described third fail-safe operation based on the cycle-value absolute angles θ 2 (0), Θ 3 (0) calculated in step ST9. As a result, if discrimination is made that the cycle-value absolute angles θ 2 (0), θ 3 (0) fall in the absolute values, the processor 5 generates the abnormal-value signal that is outputted to the upper rank system on the vehicle.

Further, if the operations subsequent to step ST17 have been already executed, then, the processor 5 executes the above-described third fail-safe operation based on the cycle-value absolute angles θ 2 (0), θ 3 (0) that are currently calculated. As a result, if discrimination is made that the cycle-value absolute angles θ 2 (0), θ 3 (0) fall in the absolute values, the processor 5 generates the abnormal-value signal that is outputted to the upper rank system on the vehicle.

In succeeding step ST11, if no operations subsequent to step ST17 are executed, the processor 5 calculates the angular velocities ω 21, ω 31 through the operations set for above in such a way that the cycle-value absolute angles θ 2 (0), θ 3 (0), stored in the memory in step ST6, is treated as the cycle-value absolute angles θ 2' (0), θ 3' (0), which are calculated in a preceding stage, and the cycle-value absolute angles θ 2 (0), θ 3 (0), calculated in step ST9, are treated as the cycle-value absolute angles θ 2 (0), θ 3' (0) that are currently calculated.

Further, if the operations subsequent to step ST17 have been already executed, then, the processor 5 calculates the angular velocities ω 21, ω 31 through the above-described operations based on the cycle-value absolute angles θ 2 (n−1), θ 3 (n−1) that are stored in the memory in the preceding step and the count absolute angles θ 2 (n), θ 3 (n) that are currently calculated.

In next step ST12, if no operations subsequent to step ST17 are executed, the processor 5 executes the above-described fourth fail-safe operation based on the angular velocities ω 21, ω 31 that are calculated in step ST11.

Further, if the operations subsequent to step ST17 have been already executed, then, the processor 5 executes the above-described fourth fail-safe operation based on the angular velocities ω 22, ω 32 that are calculated in step ST1.

As a result of these operations, if discrimination is made that the cycle-value absolute angles θ 2 (0), θ 3 (0) and the count absolute angles θ 2 (n), θ 3 (n) fall in absolute values, the processor 5 generates the abnormal-value signal that is outputted to the upper rank system on the vehicle.

In next step ST13, if no operations subsequent to step ST17 are executed, the processor 5 stores the cycle-value absolute angles θ 2 (0), θ 3 (0), calculated in step ST19, in the memory, and generates the cycle-value absolute angle signals, related to the cycle-value absolute angles θ 2 (0), θ 3 (0), which are outputted to the upper rank system on the vehicle.

Further, if the operations subsequent to step ST17 have been already executed, then, the processor 5 stores the count absolute angles θ 2 (n), θ 3 (n) in the memory and generates the count absolute-angle signals, related to the count absolute angles θ 2 (n), θ 3 (n) that are calculated, which in turn are outputted to the upper rank system on the vehicle.

In succeeding step ST 14, if no operations subsequent to step ST17 are executed, the processor 5 stores the cycle values j2 (0), j3 (0), calculated in step ST9, in the memory.

Further, if the operations subsequent to step ST17 have been already executed, then, the processor 5 stores the cycle values j2 (n), j3 (n), calculated in step ST17, in the memory.

In succeeding step ST 15, if no operations subsequent to step ST17 are executed, the processor 5 stores the digital signals S2 (0), S3 (0), delivered from the magnet sensors 22, 32, in the memory.

Further, if the operations subsequent to step ST17 have been already executed, then, the processor 5 stores the digital signals S2 (n), S3 (n), delivered from the magnet sensors 22, 32, in the memory.

In consecutive step ST16, the rotation angle sensor 1 terminates the present operation when powered off and in other cases (with "NO" in step ST16), the operation proceeds to step ST17.

Figure 10:
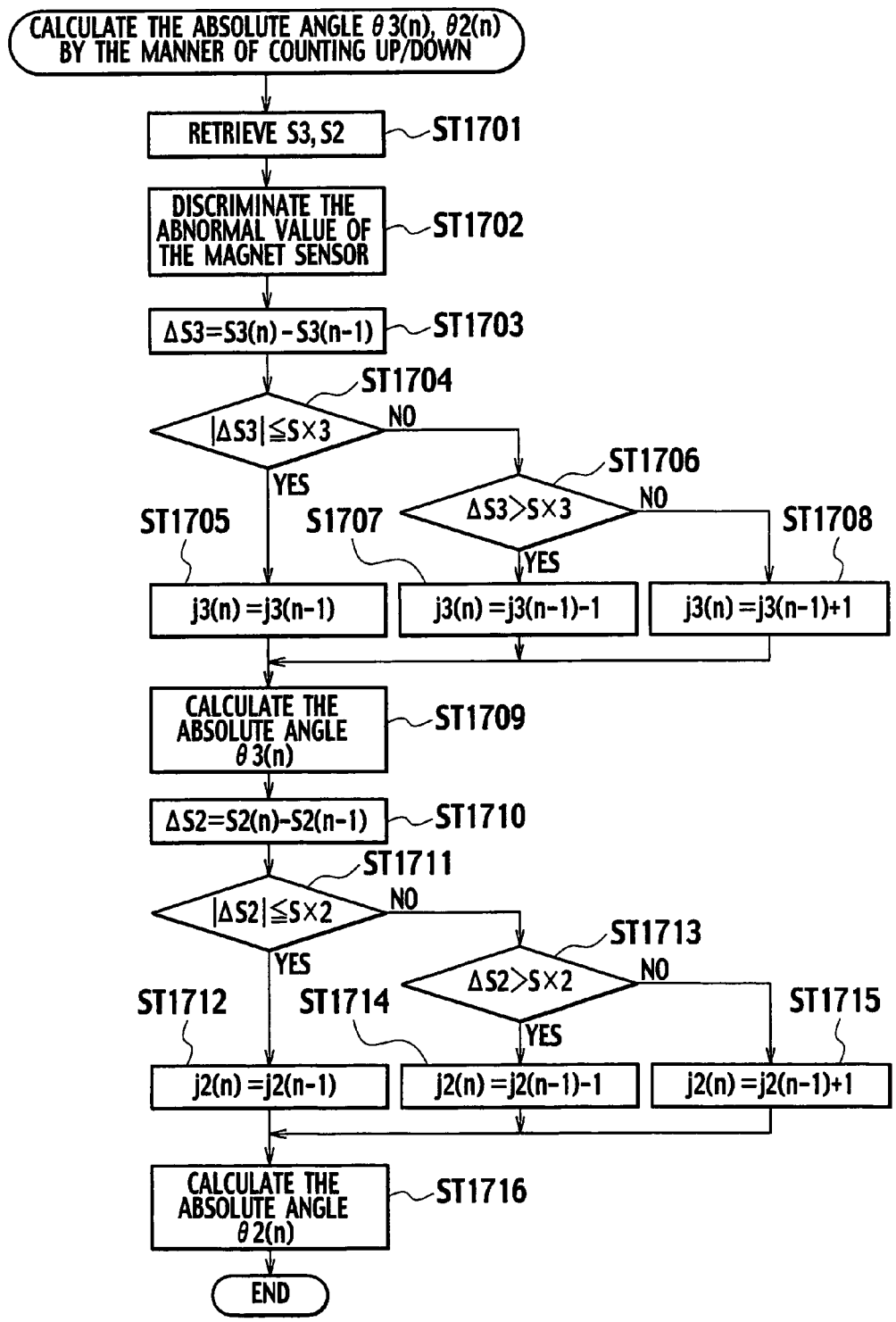
FIG. 10 is a flowchart illustrating another basic sequence of operations of the rotation angle sensor.

In step ST17, the rotation angle sensor 1 executes the operations in steps ST1701 to ST1716 sown in FIG. 10.

More particularly, when the current timing becomes the n-th sampling timing set forth above in step ST1701 shown in FIG. 10, the processor 5 outputs the selection signals and the clock signals to the magnet sensors 22, 32. Subsequently, upon receipt of the selection signals and the clock signals, the magnet sensors 22, 32 execute the operations described above to generate the digital signals that are outputted to the processor 5. When this takes place, the magnet sensors 22, 32 detect the magnetic field intensities of the magnets 21, 31 and, if the detected magnetic field intensity exceeds the given intensity range, generate magnetic field intensity abnormal-value signals that are outputted together with the digital signals to the processor 5. Subsequently, the processor 5 reads the digital signals delivered from the magnetic sensors 22, 32.

In consecutive step ST1702, the processor 5 executes the above-described first fail-safe operation. As a result, if discrimination is made that the cycle-value absolute angles θ 2 (0), θ 3 (0) and the count absolute angles θ 2 (n), θ 3 (n) fall in absolute values, the processor 5 generates the abnormal-value signal that is outputted to the upper rank system on the vehicle.

In succeeding step ST1703, the processor 5 calculates a difference Δ S3 (n) between the value S3 (n−1) of the preceding digital signal, stored in the memory, and the value S3 (n) of the digital signal that is currently read.

In subsequent step ST1704, the processor 5 discriminates whether the difference Δ S3 (n) satisfies the formula (17) set forth above. As a result, if satisfied, the operation proceeds to step ST1705 and if not (with "NO" in step ST1704), the operation proceeds to step SR1706.

In step ST1705, the processor 5 calculates the current cycle value j2 (n) as a value equal to the preceding cycle value j3 (n−1), stored in the memory, and the operation proceeds to step ST1709.

In step ST1706, the processor 5 discriminates whether the difference Δ S3 (n), calculated in step ST1703, satisfies the formula (18) set forth above. As a result, if satisfied, the operation proceeds to step ST1707 and if not (with "NO" in step ST1706), the operation proceeds to step SR1708.

In step ST1707, the processor 5 calculates the current cycle value j3 (n) as a value smaller than the preceding cycle value j3 (n−1) by 1 and the operation proceeds to step ST1709.

In step ST1708, the processor 5 calculates the current cycle value j3 (n) as a value greater than the preceding cycle value j3 (n−1) by 1 and the operation proceeds to step ST1709.

In step ST1709, the processor 5 calculates the count absolute angles θ 3 (n) using the above formula (26) based on the cycle value j3 (n), calculated in step ST1705, step ST1707 or step ST1708 and the digital signal read in step ST1701.

In succeeding step ST1710, the processor 5 calculates the difference Δ S2 (n) between the preceding digital signal S2 (n−1), stored in the memory, and the currently read digital signal S2 (n).

In consecutive step ST1711, the processor 5 discriminates whether the difference Δ S2 (n), calculated in step ST1710, satisfies the formula (14) set forth above. As a result, if satisfied, the operation proceeds to step ST1712 and if not (with "NO" in step ST1711), the operation proceeds to step ST1713.

In step ST1712, the processor 5 calculates the current cycle value j2 (n) as a value equal to the preceding cycle value j2 (n−1) stored in the memory, upon which the operation proceeds to step ST1716.

In step ST1713, the processor 5 discriminates whether the difference Δ S2 (n), calculated in step ST1710, satisfies the formula (15) set forth above. As a result, if satisfied, the operation proceeds to step ST1714 and if not (with "NO" in step ST1714), the operation proceeds to step ST1715.

In step ST1714, the processor 5 calculates the current cycle value j2 (n) as a value less than the preceding cycle value j2 (n−1), stored in the memory, by 1 and the operation proceeds to step ST1716.

In step ST1715, the processor 5 calculates the current cycle value j2 (n) as a value greater than the preceding cycle value j2 (n−1), stored in the memory, by 1 and the operation proceeds to step ST1716.

In step ST1716, the processor 5 calculates the count absolute angle θ 2 (n) using the above formula (25) based on the cycle value j2 (n), calculated in step ST1712, step ST1714 or step ST1715, and the digital signals read in step ST1701.

Figure 9:
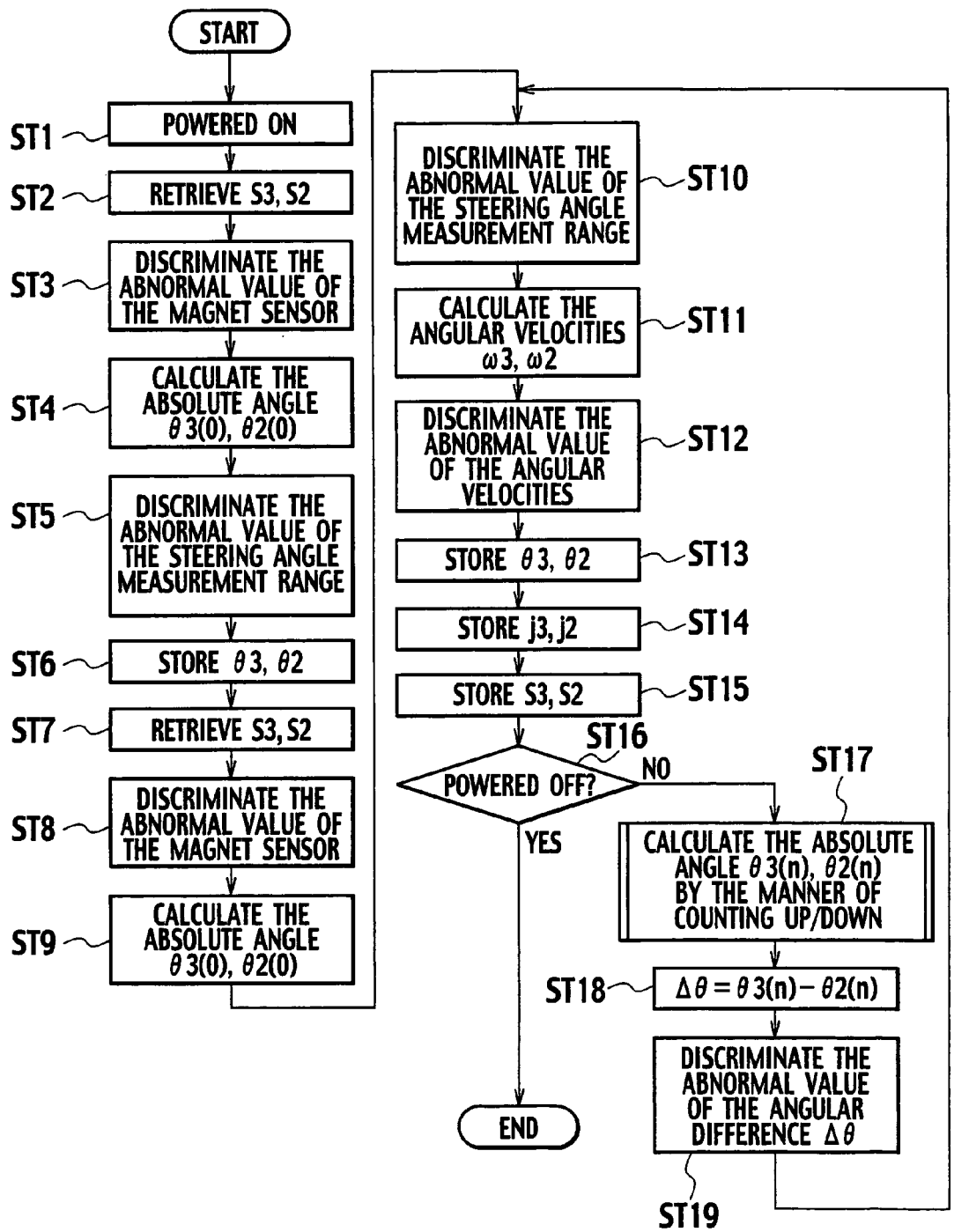
FIG. 9 is a flowchart illustrating a basic sequence of operations of the rotation angle sensor.

In next step ST18 shown in FIG. 9, the processor 5 calculates the angular difference Δ θ between the count absolute angle θ 2 (n), calculated in step ST17, and the count absolute angle θ 3 (n).

In succeeding step ST19, the processor 5 executes the above-described second fail-safe operation based on the calculated angular difference Δ θ. As a result, if discrimination is made that the count absolute angles θ 2 (n), θ 3 (n) fall in absolute values, the processor 5 generates the abnormal-value signal that is outputted to the upper rank system on the vehicle. Thereafter, the operation proceeds to step ST10.

Next, first to third examples of operations of the rotation angle sensor 1 are described. The first to third examples are described with m=135, n2=48, n3=34, rez2=rez3=10 and α=900. In this case, cycles c2, c3, the least minimum multiple and the numbers x2, x3 of cycles are expressed in formulae (44) to (48) expressed below.

$$c2=360*48/135=128 \text{ (deg)} \quad (44)$$

$$c3=360*34/135=90.666 \text{ (deg)} \quad (45)$$

$$LCM=360*24*17*2/135=2176 \text{ (deg)} \quad (46)$$

$$x2=2176/128=17 \quad (47)$$

$$X3=2176/90.666\ldots=24 \quad (48)$$

As shown in the formula (46), the first to third examples satisfy the formula (0). Accordingly, the processor 5 is able to uniquely calculate the cycle-value absolute angles θ 2 (0), θ 3 (0) and the count absolute angles θ 2 (n), θ 3 (n) within the steering angle measurement range.

FIRST EXAMPLE

Figure 11:
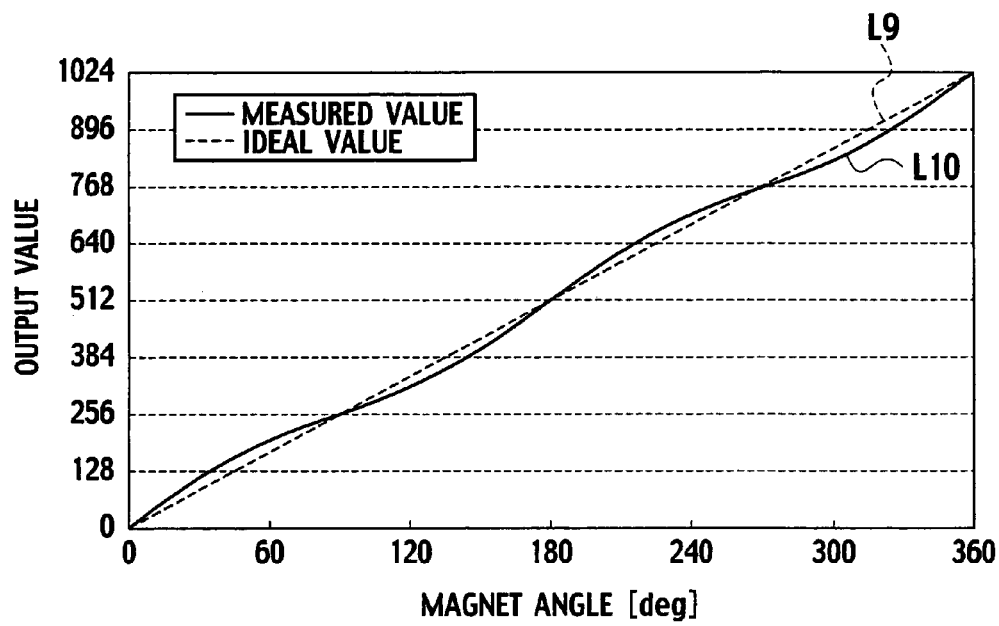
FIG. 11 is a characteristic view illustrating the relationship between the value of the digital signal, outputted from the magnet sensor, and the actual absolute angle of the detection gear.
Figure 12:
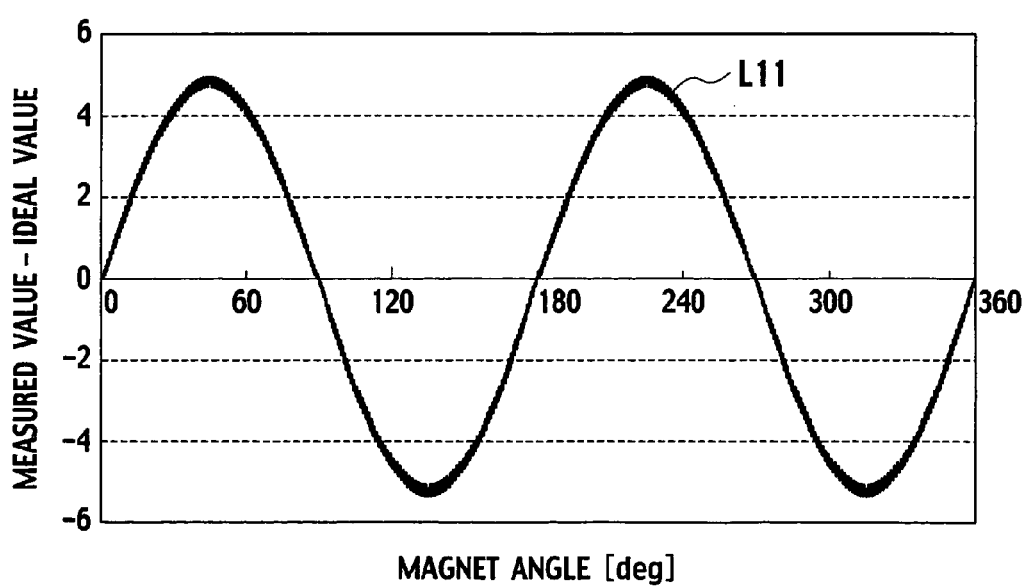
FIG. 12 is a characteristic view illustrating the relationship between the error in the value of the digital signal, outputted from the magnet sensor, and the actual absolute angle of the detection gear.

If the rotation axes of the magnets 21, 31 are deviated with respect to the magnet sensors 22, 32 or the magnet sensors 22, 32 encounter magnetic affects prevailing outside the rotation angle sensor 1, errors occur in the digital signals S2, S3 as shown in FIGS. 11 and 12. Hereunder, the errors shown in FIGS. 11 and 12 are referred to as "output errors of digital signals".

Here, FIG. 11 shows a graph L9, indicative of the relationship between actual absolute angles of the detection gears 2, 3 and ideal values of the signals S2, S3 outputted from the magnet sensors 22, 32, and a graph L10, indicative of the relationship between actual absolute angles of the detection gears 2, 3 and actual measurement values of the signals S2, S3 outputted from the magnet sensors 22, 32, which are plotted on a plane in terms of the actual absolute angles of the detection gears 2, 3 plotted on the abscissa and the values S2, S3 of the digital signals plotted on the coordinate. Also, FIG. 12 shows a graph L11, indicative of the relationship between the actual absolute angles of the detection gears 2, 3 and the errors of the values S2, S3 of the digital signals, which is plotted on a plane in terms of the actual absolute angles of the detection gears 2, 3 plotted on the abscissa and the values S2, S3 of the digital signals plotted on the coordinate.

In cases where the above-described output errors occur in the values S2 (0), S3 (0), the processor 5 executes the cycle-value absolute angle calculating operation to calculate cycle-value judgment widths MARKrevo2 and MARKrevo3.

Figure 13:
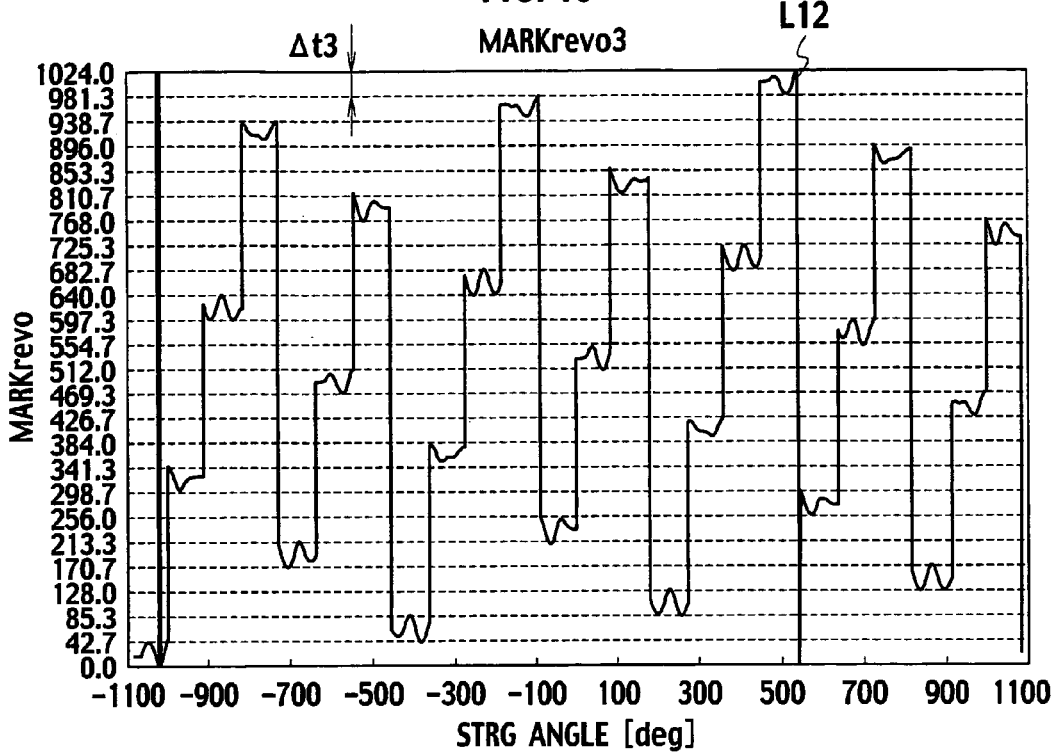
FIG. 13 is a characteristic view illustrating the relationship between the cycle-value judgment width and the actual absolute angle of the steering shaft.

Here, FIG. 13 shows a graph L12, indicative of the relationship between an actual absolute angle of a steering shaft and the cycle-value judgment value MARKrevo3, which is plotted on a plane in terms of the actual absolute angle of the steering shaft plotted on the abscissa and the cycle-value judgment value MARKrevo3 plotted on the coordinate. Also, FIG. 14 shows a graph L13, indicative of the relationship between the actual absolute angle of the steering shaft and the cycle-value judgment value MARKrevo2, which is plotted on a plane in terms of the actual absolute angle of the steering shaft plotted on the abscissa and the cycle-value judgment value MARKrevo2 plotted on the coordinate.

Figure 14:
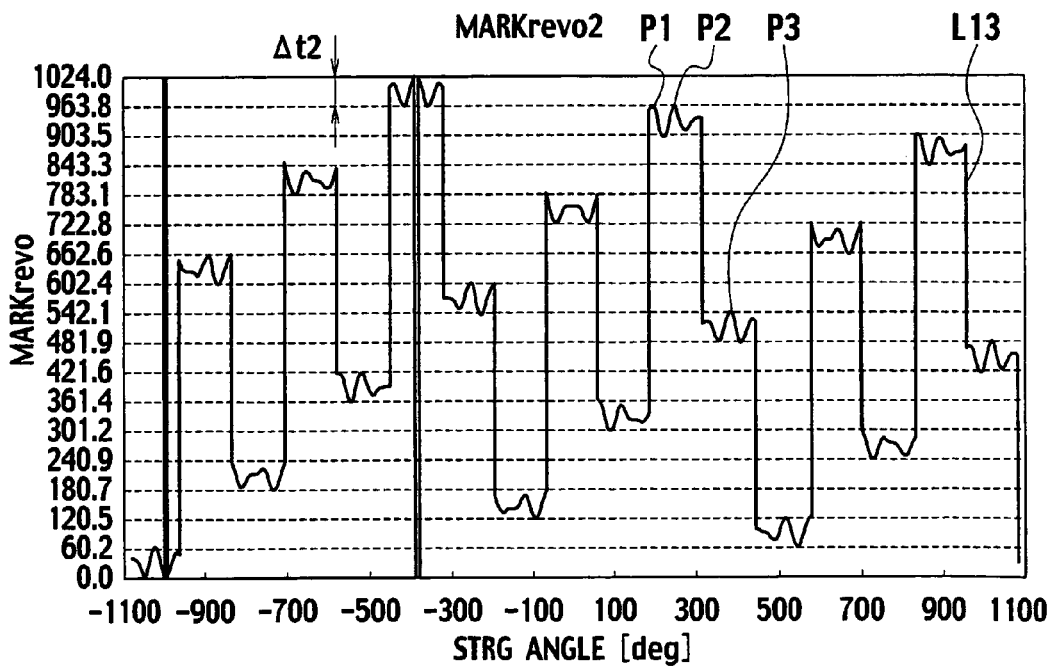
FIG. 14 is a characteristic view illustrating the relationship between the cycle-value judgment width and the actual absolute angle of the steering shaft.

As shown in FIGS. 13 and 14, the graph L12 has 24-pieces of cycle-value judgment sections, like those of the graph L7 shown in FIG. 6, and the graph L13 has 17-pieces of cycle-value judgment sections like the graph L8 shown in FIG. 7.

However, in the graphs L12 and L13, the cycle-value judgment values MARKrevo2 and MARKrevo3, each of which belongs to one cycle-value judgment section, have cycle-value jumping points (for instance, points P1 to P3 as shown in FIG. 14) that take values in the next upper or next lower level of divided ranges associated with a divided range to which the relevant cycle-value judgment section belongs. These points result from the occurrence in that the output errors are greater than those occurring in other points in the digital signals, respectively.

Therefore, during the cycle-value absolute angle calculating operation, the processor 5 is susceptible to calculate error cycle values j2 (0), j3 (0). In other words, this results in cycle-value jumping. For instance, the cycle value j2 (0) fundamentally lies at a value of 10 in the point P1 but the processor 5 calculates the cycle value j2 (0) as a value laying at 5.

Also, cycle-value jumping values (indicative of differences between actual measurement values of the cycle values j2, j3 and ideal values of the same) are determined depending on combinations of the gear teeth n2, n3 of the detection gears 2, 3 and, in the examples, lie in a value of ±5 with respect to the cycle value j2 and a value of ±7 with respect to the cycle value j3.

Figure 15:
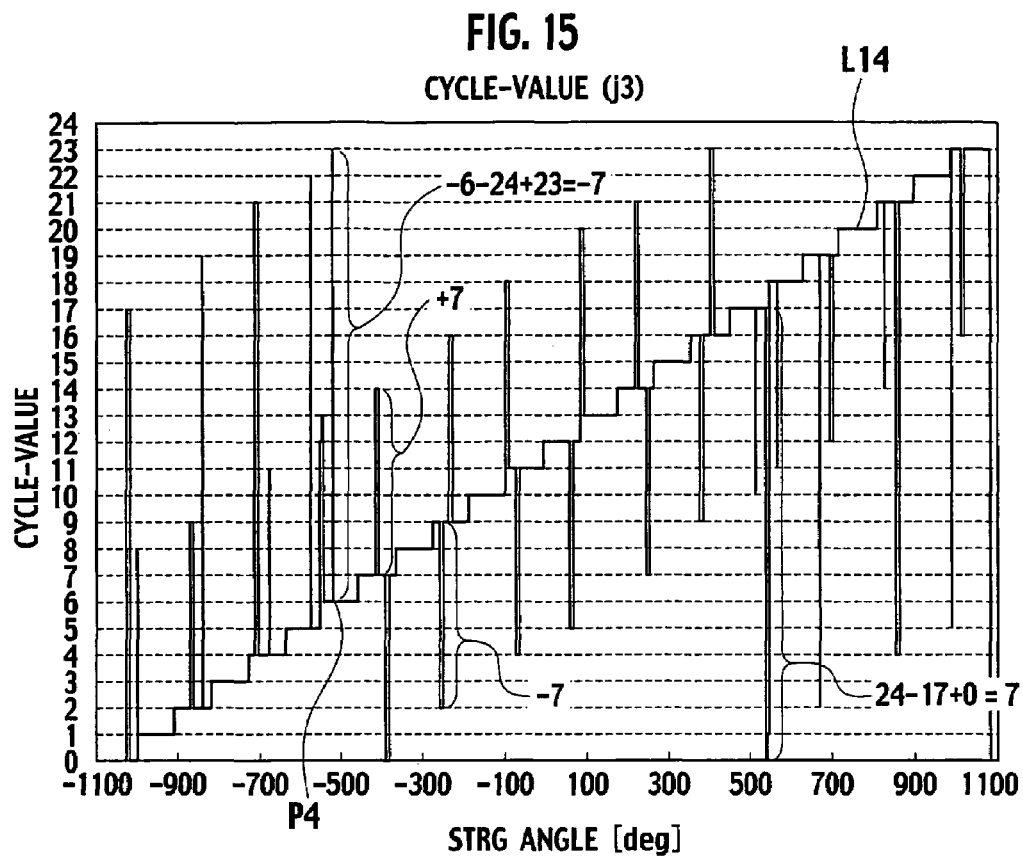
FIG. 15 is a characteristic view illustrating the relationship between a cycle value and the actual absolute angle of the steering shaft.
Figure 16:
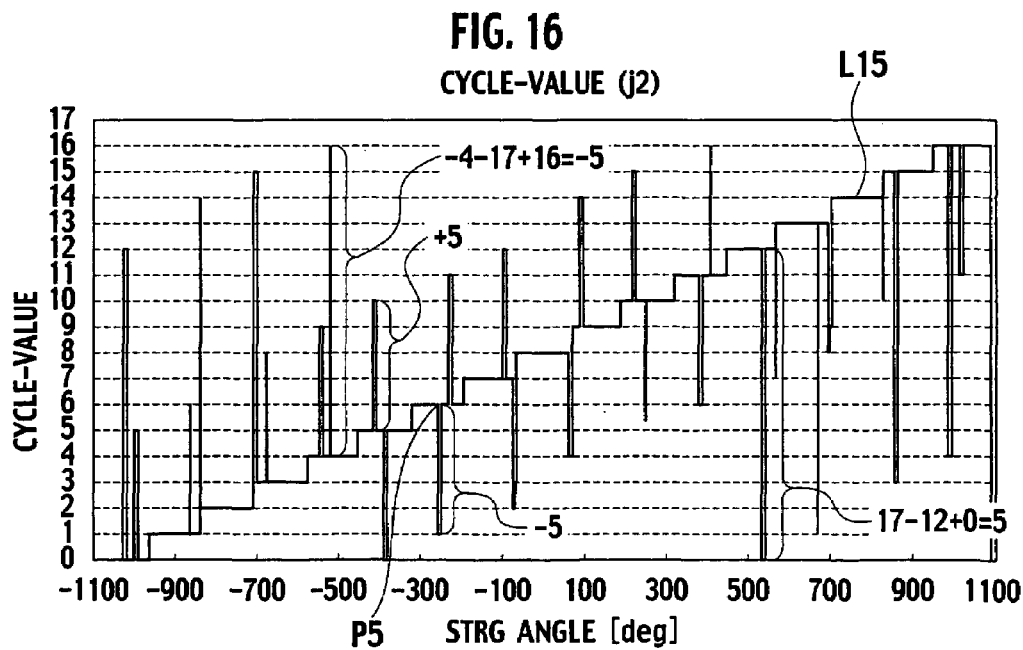
FIG. 16 is a characteristic view illustrating the relationship between another cycle value and the actual absolute angle of the steering shaft.

Accordingly, if the processor 5 calculates the cycle values j2 (0), j3 (0) under circumstances where the above output errors occur in the values S2 (0), S3 (0) of the digital signals, respectively, the cycle value jumping occurs in the cycle values j2 (0), j3 (0) as shown in FIGS. 15 and 16.

Here, FIG. 15 shows a graph L14, indicative of the relationship between an actual absolute angle of a steering shaft and the cycle value j3 (0), which is plotted on a plane in terms of the actual absolute angle of the steering shaft plotted on the abscissa and the cycle value j3 (0) plotted on the coordinate. FIG. 16 shows a graph L15, indicative of the relationship between an actual absolute angle of a steering shaft and the cycle value j2 (0), which is plotted on a plane in terms of the actual absolute angle of the steering shaft plotted on the abscissa and the cycle value j2 (0) plotted on the coordinate.

For instance, the cycle value j3 fundamentally lies at a value of 6 on a point P4 but the processor 5 calculates the cycle value j3 as a value laying at 23. This is because, as shown in FIG. 13, the next lower divided range, associated with the divided range corresponding to the cycle value j3=6 by one, corresponds to the cycle value j3=23. When this takes place, upon rewriting the cycle value j3=23 with a factor expressed as —(=23−24), the cycle value jumping takes a value expressed as −1−6=−7. Also, for instance, the cycle value j2 lies at a value of 6 on a point P5, where the cycle value jumping takes place, but the processor 5 calculates the cycle value j2 as a value of 1. When this takes place, the cycle value jumping results in a value expressed as 1−6=−5.

Further, according to the formulae (11) to (12), in cases where the cycle value jumping takes place, an angular error E2, expressed in the formula (49), occurs in the cycle-value absolute angle θ 2 (0) and an angular error E3, expressed in the formula (50), occurs in the cycle-value absolute angle θ 3 (0).

$$E2 = c2 * (\pm 5) = 128 * (\pm 5) = \pm 640 \quad (49)$$

$$E3 = c3 * (\pm 7) = 90.666\ldots * (\pm 7) = \pm 634.66 \quad (50)$$

Further, upon increasing or decreasing the cycle values j2 (0), j3 (0) as set forth above, the processor 5 calculates the cycle values j2 (n), j3 (n). As a consequence, with the cycle-value jumping taking place in the cycle-value absolute angle calculating operation, the angular error E2 also occurs in the count absolute angle θ 2 (n) and the angular error E3 also occurs in the count absolute angle θ 3 (n).

Accordingly, in the occurrence of the cycle-value jumping, the angular velocities ω 21, ω 31 dramatically varies and, hence, either one of the formulae (40) to (43) are satisfied. Accordingly, the processor 5 executes the above-described fourth fail-safe operation with a possibility to discriminate that the cycle-value absolute angles θ 2 (0), θ 3 (0) fall in the abnormal values.

Furthermore, as a result of cycle-value jumping effects, under circumstances where at least one of the cycle-value absolute angles θ 2 (0), θ 3 (0) exceeds the steering angle measurement range, the processor 5 executes the above-described third fail-safe operation with a possibility to discriminate that the cycle-value absolute angles θ 2 (0), θ 3 (0) fall in the abnormal values.

FIG. 17 shows a graph L16, indicative of the relationship between the actual absolute angle of the steering shaft and the cycle-value absolute angle θ 3 (0), which is plotted on a plane in terms of the actual absolute angle of the steering shaft plotted on the abscissa and the cycle-value absolute angle θ 3 (0) plotted on the coordinate. FIG. 18 shows a graph L17, indicative of the relationship between the actual absolute angle of the steering shaft and the cycle-value absolute angle θ 2 (0), and regions A1 and A2 outside the steering angle measurement range of the steering shaft, which are plotted on a plane in terms of the actual absolute angle of the steering shaft plotted on the abscissa and the cycle-value absolute angle θ 2 (0) plotted on the coordinate.

SECOND EXAMPLE

Next, the second example is described. If the processor 5 executes the cycle-value absolute angle calculating operation to calculate the cycle values j2 (0), j3 (0) under circumstances where an actual absolute steering angle of the steering shaft lies at a value of −677.8 (deg) (in the point A indicated in FIGS. 19 and 20) at time when the rotation angle sensor 1 is powered on, the cycle-value jumping occurs in the cycle values j2 (0), j3 (0).

Figure 19:
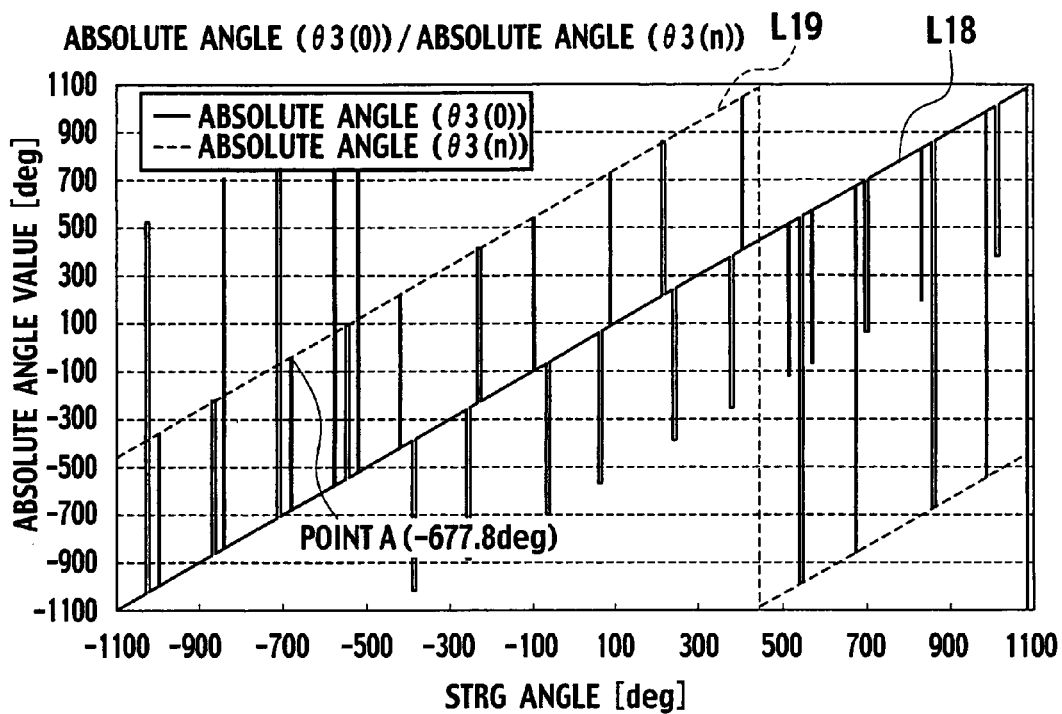
FIG. 19 is a characteristic view illustrating the relationship among the cycle-value absolute angle, a count absolute angle and the actual absolute angle of the steering shaft.

Here, FIG. 19 shows graphs L18, L19 that are plotted on a plane in terms of the actual absolute angle of the steering shaft plotted on the abscissa and the count absolute angle θ 3 (n) plotted on the coordinate. The graph L18 shows the relationship between the actual absolute angle of the steering shaft and the cycle-value absolute angle θ 3 (0), and the graph L19 shows the relationship between the actual absolute angle of the steering shaft and the count absolute angle θ 3 (n) which the processor 5 has calculated based on the cycle values j3 (0) calculated at the point A.

Figure 20:
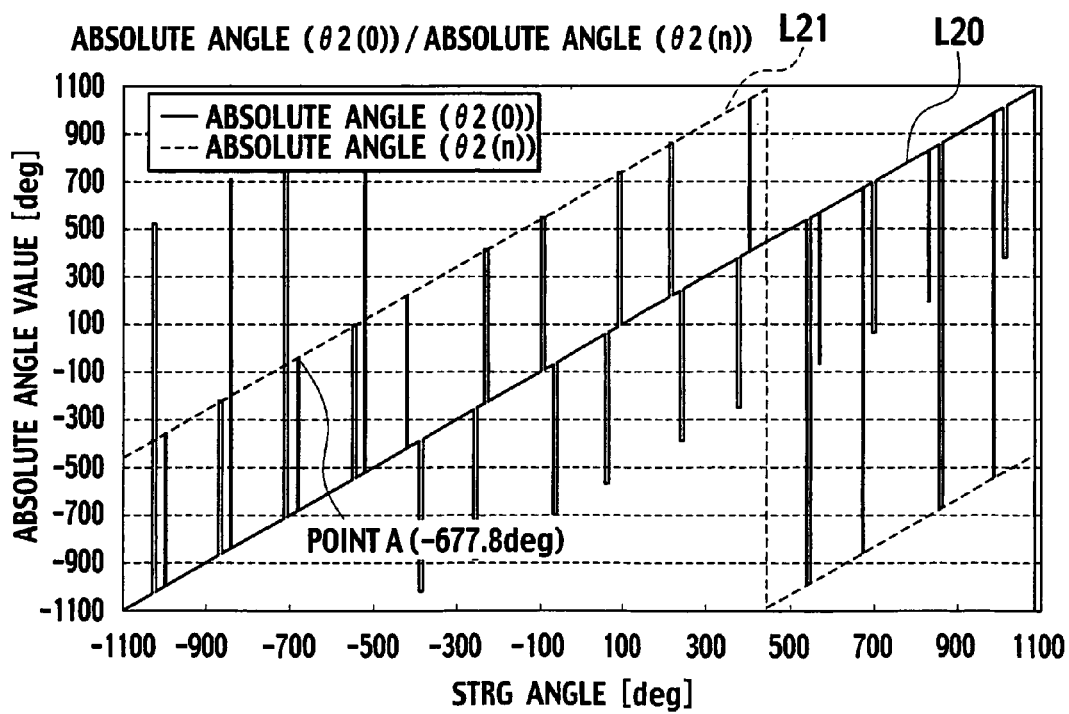
FIG. 20 is a characteristic view illustrating the relationship among the cycle-value absolute angle, a count absolute angle and the actual absolute angle of the steering shaft.

Further, FIG. 20 shows graphs L20, L21 that are plotted on a plane in terms of the actual absolute angle of the steering shaft plotted on the abscissa and the cycle-value absolute angle θ 2 (0) and the count absolute angle θ 2 (n) plotted on the coordinate. The graph L20 shows the relationship between the actual absolute angle of the steering shaft and the cycle-value absolute angle θ 2 (0). Also, the graph L21 shows the relationship between the actual absolute angle of the steering shaft and the count absolute angle θ 2 (n) which the processor 5 has calculated based on the cycle values j2 (0) calculated at the point A.

With no rotation occurring in the steering shaft under such a condition, the angular velocities ω 21, ω 31 become zeroed and, hence, the processor 5 is hard to discriminate during the above-described fourth fail-safe operation that the cycle-value absolute angles θ 2 (0), θ 3 (0) fall in the abnormal values. Moreover, under such a condition, either of the cycle-value absolute angles θ 2 (0), θ 3 (0) takes a value within the steering angle measurement range and even if the processor 5 executes the above-described third fail-safe operation, the processor 5 cannot discriminate that the cycle-value absolute angles θ 2 (0), θ 3 (0) fall in the abnormal values. Thus, under such a condition, this results in the execution of the count absolute-angle calculating operation with the cycle-value absolute angles θ 2 (0), θ 3 (0) remaining unchanged in the abnormal values.

Figure 21:
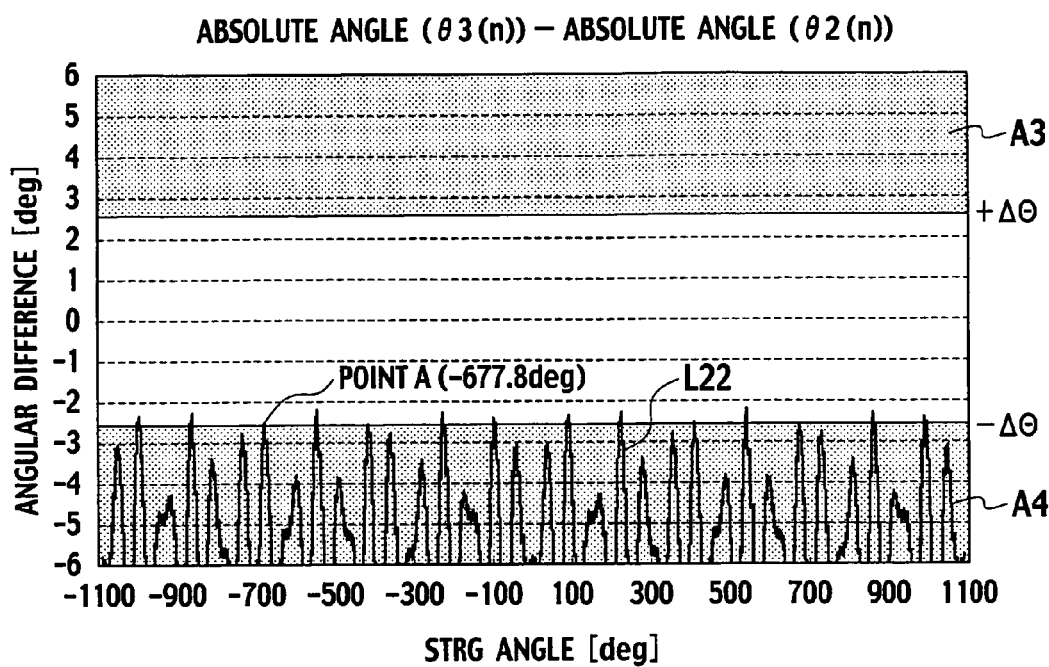
FIG. 21 is a characteristic view illustrating the relationship between an angular difference on the count absolute angle and the actual absolute angle of the steering shaft.

In the execution of the count absolute-angle calculating operation under such a condition, as shown in FIG. 21, the angular velocity Δ θ between the count absolute angle θ 2 (n) and the count absolute angle θ 3 (n) does not satisfy the formula (29) and, hence, even if the processor 5 executes the above-described second fail-safe operation, the processor 5 cannot discriminate that the count absolute angle θ 2 (n) and the count absolute angle θ 3 (n) fall in the abnormal values.

Here, FIG. 21 shows a graph L22 and regions A3, A4, outside the reference angle difference Δ Θ, which are indicated on a plane in terms of the actual absolute angle of the steering shaft plotted on the abscissa and the angular velocity Δ θ plotted on the coordinate.

Here, the relationship between the reference angle difference Δ Θ and the angular differences E2, E3 is expressed by a formula (51) described below.

$$\Delta\Theta * 2 = c2/x3 = c3/x2 = 5.33 \ldots = E2 - E3 \quad (51)$$

In the meantime, with such a condition, since the cycle-value jumping occurs, the formula (51) shows that the reference angle difference Δ θ should satisfy the formula (29). However, under such a condition, the angular difference Δ θ does not satisfy the formula (29). This results from reasons described below. That is, not only the above-described angular errors E2, E3 but also errors, resulting from the output errors in the digital signals, occur in the count absolute angles θ 2 (n), θ 3 (n) as expressed in the formulae (25) and (26). Stated another way, the count absolute angles θ 2 (n), θ 3 (n) are also adversely affected with the output errors in the digital signals. In the meanwhile, under such a condition, the digital signals have increased output errors. Therefore, due to an increase in the adverse affect from the output errors in the digital signals, no angular difference Δ θ satisfies the formula (29).

However, if the steering shaft rotates by a little extent under such a condition, the output errors of the digital signals decrease as shown in FIG. 11, resulting in a decrease in the adverse affect of the output errors of the digital signals on the count absolute angles θ 2 (n), θ 3 (n). Therefore, the angular difference Δ θ takes a value at the same level as a difference between the angular differences E2 and E3 and the formula (29) is satisfied. Accordingly, due to the above-described second fail-safe operation, the processor S is enabled to discriminate that the count absolute angles θ 2 (n), θ 3 (n) fall in the abnormal values.

Figure 22:
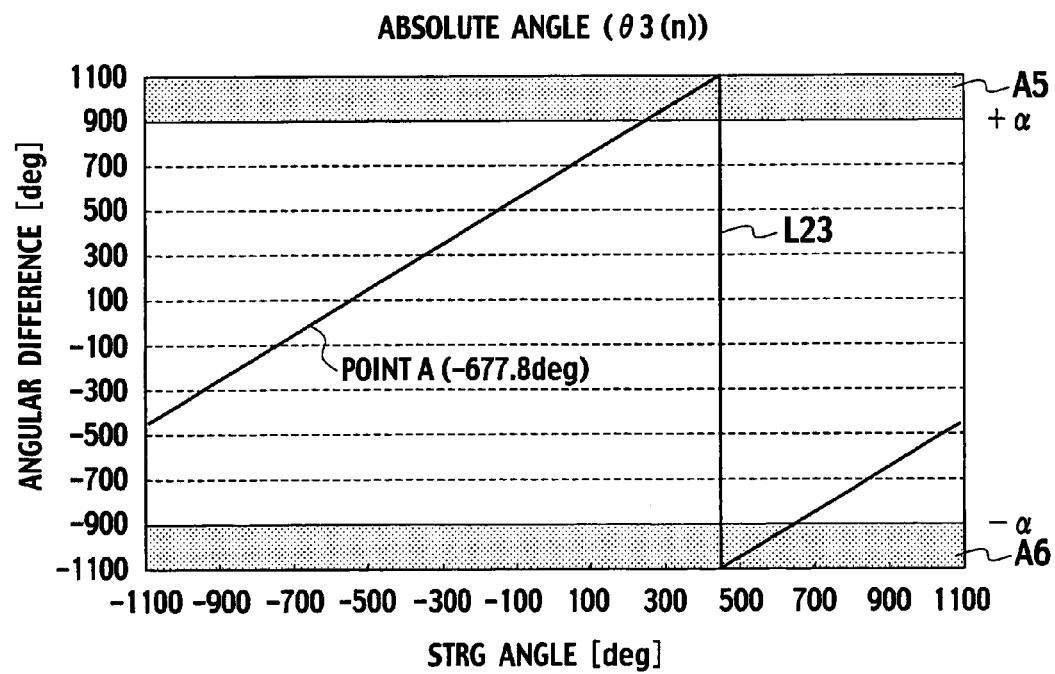
FIG. 22 is a characteristic view illustrating the relationship between the count absolute angle and the actual absolute angle of the steering shaft.

Further, in cases where due to the rotation of the steering shaft, the count absolute angles θ 2 (n), θ 3 (n) take values remaining outside the steering angle measurement range, the execution of the above-described third fail-safe operation allows the processor 5 to enable judgment that the count absolute angles θ 2 (n), θ 3 (n) fall in the abnormal values. Here, FIG. 22 shows a graph L23, indicative of the relationship between the actual absolute angle of the steering shaft and the count absolute angles θ 3 (n), and regions A5, A6, outside the steering angle measurement range, which are indicated on a plane in terms of the actual absolute angle of the steering shaft plotted on the abscissa and the count absolute angles θ 3 (n) plotted on the coordinate.

Further, in cases where the reference angular difference Δ Θ satisfies the formula (27-1), when executing the second fail-safe operation, the processor 5 is able to discriminate, prior to the occurrence of the cycle-value absolute angles θ 2 (0), θ 3 (0) and the count absolute angles θ 2 (n), θ 3 (n) actually falling in the abnormal values, whether the cycle-value absolute angles θ 2 (0), θ 3 (0) and the count absolute angles θ 2 (n), θ 3 (n) fall in the abnormal values.

For instance, in cases where the reference angular difference Δ Θ takes a value of 2 (deg) less than a value of 2.665 (=c2/x3/2) (deg), due to the operation of the processor 5 to execute the second fail-safe operation after executing steps ST4 and ST9 shown in FIG. 9, the processor 5 is able to discriminate that the cycle-value absolute angles θ 2 (0), θ 3 (0) and the count absolute angles θ 2 (n), θ 3 (n) fall in the abnormal values. That is, the processor 5 enables discrimination to find, without rendering the steering operative, whether the cycle-value absolute angles θ 2 (0), θ 3 (0) and the count absolute angles θ 2 (n), θ 3 (n), which are calculated when the rotation angle sensor 1 is powered on, fall in the abnormal values.

Accordingly, the processor 5 is able to discriminate, prior to the steering shaft being actuated, that the cycle-value absolute angles θ 2 (0), θ 3 (0) and the count absolute angles θ 2 (n), θ 3 (n), which are calculated when the rotation angle sensor 1 is powered on, fall in the abnormal values.

THIRD EXAMPLE

Figure 23:
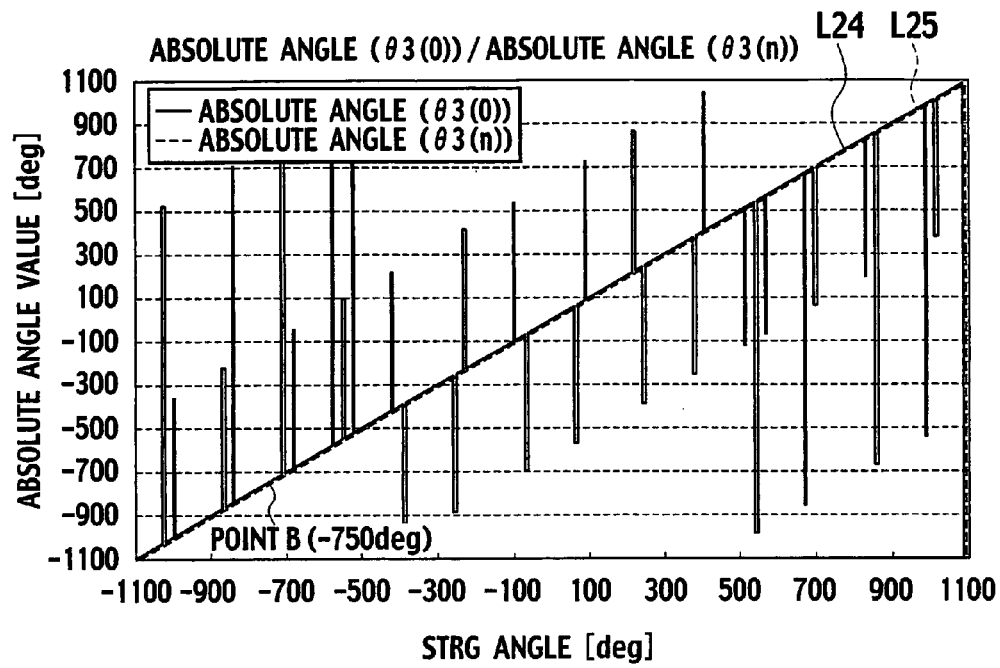
FIG. 23 is a characteristic view illustrating the relationship among the cycle-value absolute angle, the count absolute angle and the actual absolute angle of the steering shaft.
Figure 24:
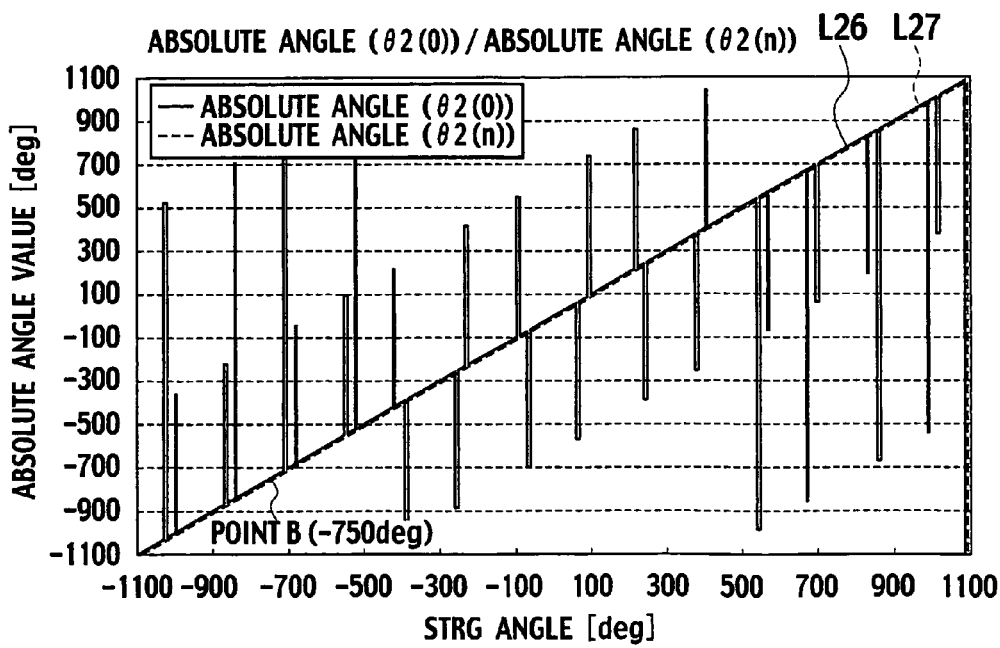
FIG. 24 is a characteristic view illustrating the relationship among the cycle-value absolute angle, a count absolute angle and the actual absolute angle of the steering shaft.

Next, the third example is described. In cases where the actual absolute angle of the steering shaft lies at −750 (deg) (at a point B in FIGS. 23 and 24) when the rotation angle sensor 1 is powered on, the processor 5 enables the accurate calculation of the cycle values j2 (0), j3 (0) as shown in FIGS. 23 and 24. Under such a condition, since the output errors of the digital signals become less and, thus, the cycle-value jumping does not occur.

Here, FIG. 23 shows graphs L24, L25 that are plotted on a plane in terms of the actual absolute angle of the steering shaft plotted on the abscissa and the cycle-value absolute angle θ 3 (0) and the count absolute angles θ 3 (n) plotted on the coordinate. The graph L24 shows the relationship between the actual absolute angle of the steering shaft and the cycle-value absolute angle θ 3 (0). Also, the graph L25 shows the relationship between the actual absolute angle of the steering shaft and the count absolute angle θ 3 (n) which the processor 5 has calculated based on the cycle values j3 (0) calculated at the point B.

Further, FIG. 24 shows graphs L26, L27 that are indicated on a plane in terms of the actual absolute angle of the steering shaft plotted on the abscissa and the cycle-value absolute angle θ 2 (0) and the count absolute angles θ 2 (n), calculated by the processor 5, which are plotted on the coordinate. The graph L26 shows the relationship between the actual absolute angle of the steering shaft and the cycle-value absolute angle θ 2 (0). Also, the graph L27 shows the relationship between the actual absolute angle of the steering shaft and the count absolute angle θ 2 (n) which the processor 5 has calculated based on the cycle values j2 (0) calculated at the point B.

Consequently, the processor 5 is able to execute the count absolute-angle calculating operation based on the accurately calculated cycle values j2 (0), j3 (0).

Figure 25:
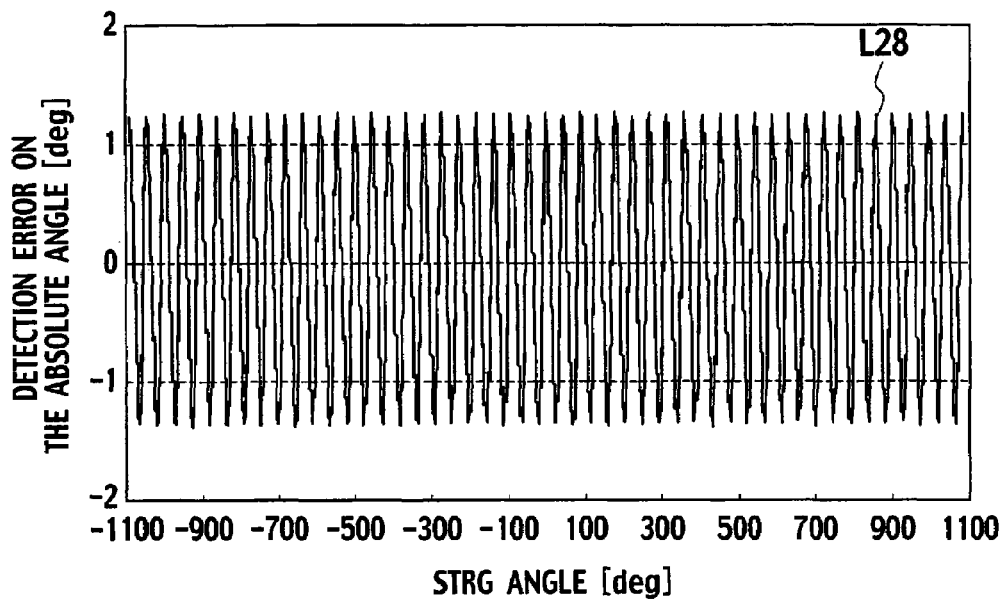
FIG. 25 is a characteristic view illustrating the relationship between a detection error on the count absolute angle and the actual absolute angle of the steering shaft.
Figure 26:
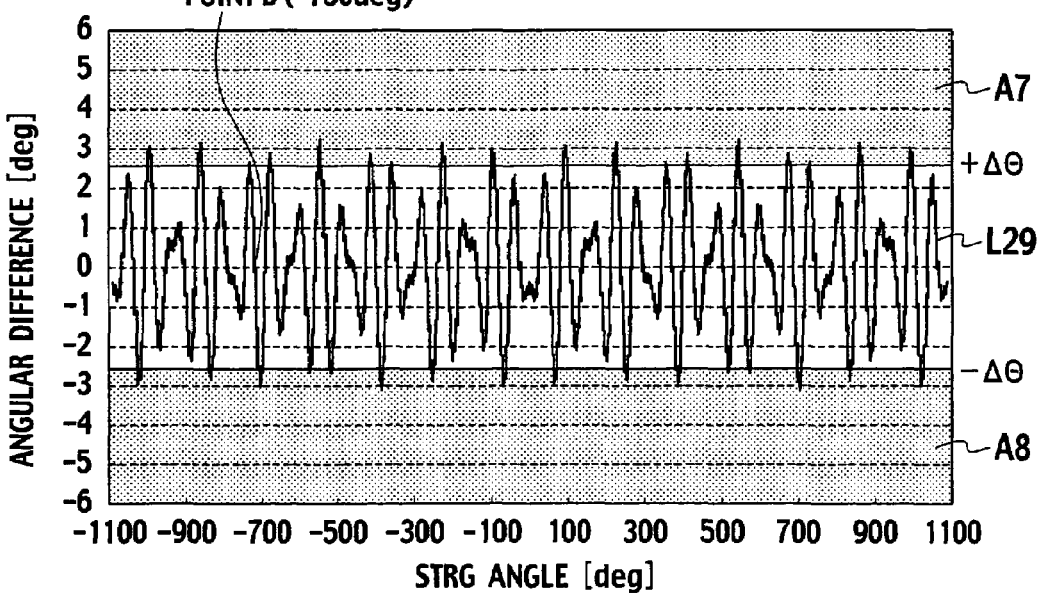
FIG. 26 is a characteristic view illustrating the relationship between the angular difference on the count absolute angle and the actual absolute angle of the steering shaft.

However, as set forth above with reference to the second example, the count absolute angles θ 2 (n), θ 3 (n) are susceptible to be adversely affected with the output errors in the digital signals. Such adverse affects vary such that the larger the output errors in the digital signals, the larger will be the adverse affects as shown in FIG. 25. As a consequence, as shown in FIG. 26, immediately after the processor 5 commences to calculate the count absolute angles θ 2 (n), θ 3 (n), although the angular difference Δ θ does not satisfy the formula (29), if the steering shaft subsequently rotates to cause the output errors in the digital signals to increase to the extent at which the cycle-value jumping occurs, there is a probability for the angular difference Δ θ to satisfy the formula (29).

Here, FIG. 25 shows a graph L28, indicative of the relationship between the actual absolute angle of the steering shaft and a detection error (a difference between the count absolute angles θ 3 (n) and the actual absolute angle of the steering shaft) of the count absolute angles θ 3 (n), which is indicated on a plane in terms of the actual absolute angle of the steering shaft plotted on the abscissa and the cycle-value absolute angle θ 2 (0) and the detection error of the count absolute angles θ 3 (n) plotted on the coordinate. FIG. 26 shows a graph L29, indicative of the relationship between the actual absolute angle of the steering shaft and the angular difference Δ θ, and regions A7, A8 prevailing outside a range of the reference angular difference Δ Θ, which are plotted on a plane in terms of the actual absolute angle of the steering shaft on the abscissa and the angular difference Δ θ on the coordinate.

Accordingly, due to the above-described second fail-safe operation, the processor 5 enables the judgment that the cycle-value absolute angles θ 2 (0), θ 3 (0) and the count absolute angles θ 2 (n), θ 3 (n) fall in the abnormal values.

From the foregoing procedure, with the first embodiment, the rotation angle sensor 1 enables the discrimination to find whether the cycle-value absolute angles θ 2 (0), θ 3 (0) and the count absolute angles θ 2 (n), θ 3 (n) fall in the abnormal values.

As a consequence, the upper rank system on the vehicle is able to utilize the result of the above discrimination. More particularly, in the presence of the judgment in that either the cycle-value absolute angles θ 2 (0), θ 3 (0) or the count absolute angles θ 2 (n), θ 3 (n) fall in the abnormal value, the rotation angle sensor 1 outputs the abnormal-value signal to the upper rank system on the vehicle. Accordingly, upon receipt of the abnormal-value signal, the upper rank system on the vehicle is able to avoid the utilization of the cycle-value absolute angle signals and the count absolute-angle signals delivered from the rotation angle sensor 1. Therefore, the rotation angle sensor 1 is able to protect the upper rank system on the vehicle from erroneous operation. Also, the rotation angle sensor 1 has an improved reliability and precision.

Further, in cases where, during the second fail-safe operation, the angular difference Δ θ exceeds the reference angular difference Δ Θ even for one time, the rotation angle sensor 1 outputs the abnormal-value signal to the upper rank system on the vehicle even when the rotation angle sensor 1 is powered on. As a consequence, under circumstances where the cycle-value absolute angles θ 2 (0), θ 3 (0) and the count absolute angles θ 2 (n), θ 3 (n), calculated when the rotation angle sensor 1 is powered on, take the abnormal values, the rotation angle sensor 1 is able to immediately output the abnormal-value signal to the upper rank system on the vehicle. Therefore, the rotation angle sensor 1 is able to reliably protect the upper rank system on the vehicle from erroneous operation.

Furthermore, due to the execution of the second fail-safe operation, even under circumstances where the cycle-value absolute angles θ 2 (0), θ 3 (0) and the count absolute angles θ 2 (n), θ 3 (n) take the abnormal values as a result of secular variations of the rotation angle sensor 1, the rotation angle sensor 1 is able to discriminate that the cycle-value absolute angles θ 2 (0), θ 3 (0) and the count absolute angles θ 2 (n), θ 3 (n) fall in the abnormal values.

Moreover, the least common multiple LCM between the cycle c2 of the magnet sensor 22 and the cycle c3 of the magnet sensor 32 exceeds the steering angle measurement range. Here, as set forth above, the cycles c2, c3 of the magnet sensors 22, 32 depend on the gear teeth n2, n3 of the detection gears 2, 3. Consequently, as far as the gear teeth n2, n3 of the detection gears 2, 3 satisfy a condition that "the least common multiple LCM between the cycle c2 of the magnet sensor 22 and the cycle c3 of the magnet sensor 32 exceeds the steering angle measurement range", the rotation angle sensor 1 is able to make discrimination to find whether the cycle-value absolute angles θ 2 (0), θ 3 (0) and the count absolute angles θ 2 (n), θ 3 (n), that is, the absolute angle of the steering shaft, take the absolute values. Therefore, not only in cases where the gear teeth n2, n3 of the detection gears 2, 3 are equal to the gear teeth described in the "Patent Literature 1" but also in cases where the gear teeth n2, n3 of the detection gears 2, 3 take values different from the gear teeth described in the "Patent Literature 1", the rotation angle sensor 1 is able to make discrimination whether the absolute angle of the steering shaft takes the abnormal value.

Further, the rotation angle sensor 1 is able to discriminate whether any of the cycle-value absolute angles θ 2 (0), θ 3 (0) and the count absolute angles θ 2 (n), θ 3 (n) take the abnormal value. As a consequence, under circumstances where any of these absolute angles falls in the absolute value, the rotation angle sensor 1 is able to output the abnormal-value signal to the upper rank system on the vehicle and, thus, erroneous operation of the upper rank system on the vehicle can be reliably prevented.

Furthermore, the rotation angle sensor 1 has a capability of calculating the angular difference Δ θ between the count absolute, angles θ 2 (n) and θ 3 (n) and discriminating that both the count absolute angles θ 2 (n) and θ 3 (n) fall in the absolute values when the angular difference Δ θ exceeds the reference angular difference Δ Θ.

Moreover, with the reference angular difference Δ Θ set to a value to satisfy the formula (27-1), the rotation angle sensor 1 is able to make judgment, prior to the occurrence of the cycle-value absolute angles θ 2 (0), θ 3 (0) and the count absolute angles θ 2 (n), θ 3 (n) actually falling in the abnormal values, that the cycle-value absolute angles θ 2 (0), θ 3 (0) and the count absolute angles θ 2 (n), θ 3 (n) take the abnormal values.

In addition, in cases where the angular velocities ω 21, ω 22, ω 31, ω 32 are calculated and the angular velocities ω 21, ω 22, ω 31, ω 32 satisfy any of the above-described formulae (40) to (43), the rotation angle sensor 1 enables the judgment that both the cycle-value absolute angles θ 2 (0), θ 3 (0) and the count absolute angles θ 2 (n), θ 3 (n) fall in the abnormal values.

Besides, in cases where the magnet sensors 22, 32 output magnetic-field-intensity abnormal-value signals, the rotation angle sensor 1 discriminates that both the cycle-value absolute angles θ 2 (0), θ 3 (0) and the count absolute angles θ

2 (n), θ 3 (n) fall in the abnormal values. Consequently, even in the presence of abnormalities in the magnetic field around the magnet sensors 22, 32, the rotation angle sensor 1 enables the judgment that the cycle-value absolute angles θ 2 (0), θ 3 (0) and the count absolute angles θ 2 (n), θ 3 (n) fall in the abnormal values.

In addition, in cases where any of the cycle-value absolute angles θ 2 (0), θ 3 (0) and the count absolute angles θ 2 (n), θ 3 (n) exceeds the steering angle measurement range, the rotation angle sensor 1 discriminates that both the count absolute angles θ 2 (n), θ 3 (n) have the absolute values.

Also, while the first embodiment has been described with reference to exemplary cases where the third and fourth fail-safe operations are executed based on the cycle-value absolute angles θ 2 (0), θ 3 (0) and the first to fourth fail-safe operations are executed based on the count absolute angles θ 2 (n), θ 3 (n), the first to fourth fail-safe operations are executed based on both the cycle-value absolute angles θ 2 (0), θ 3 (0) and the count absolute angles θ 2 (n), θ 3 (n).

In this case, the rotation angle sensor 1 enables the judgment, prior to the cycle-value absolute angles θ 2 (0), θ 3 (0) and the count absolute angles θ 2 (n), θ 3 (n) falling in the abnormal values, that the cycle-value absolute angles θ 2 (0), θ 3 (0) and the count absolute angles θ 2 (n), θ 3 (n) take the abnormal values.

Further, while the rotation angle sensor 1 has been described as having a capability of outputting the abnormal-value signal to the upper rank system on the vehicle in a case where discrimination is made that the cycle-value absolute angles θ 2 (0), θ 3 (0) and the count absolute angles θ 2 (n), θ 3 (n) take the abnormal values, in this case, the rotation angle sensor 1 may be configured not to output the cycle-value absolute angle signals and the count absolute-signal signals to the upper rank system on the vehicle. Furthermore, the value of 360 (deg) in the formulae (11), (12), (22), (23), (25) and (26) represents a rotation range which the magnet sensors 22, 23 can detect. Accordingly, this value may be altered depending on the relevant rotation range.

(Second Embodiment)

Next, a second embodiment according to the present invention is described with reference to the accompanying drawings. A rotation angle sensor 1-2 of the second embodiment is substantially similar in structure to the rotation angle sensor 1 but differs from the same in respect of abnormal judgment operation for the count absolute angles θ 2 (n), θ 3 (n). First, a basic sequence of operations of the rotation angle sensor 1-2 is described in conjunction with flowcharts shown in FIGS. 27 to 29.

In steps ST201 and ST202, the rotation angle sensor 2-1 executes the same operation as those of steps ST1 to ST15 shown in FIG. 9.

In next step ST203, the rotation angle sensor 1-2 allows the operation to proceed to step ST205 when an ignition is turned on (step ST203: YES) and if the ignition remains turned off (step ST203: NO), the operation proceeds to step ST204.

Figure 28:
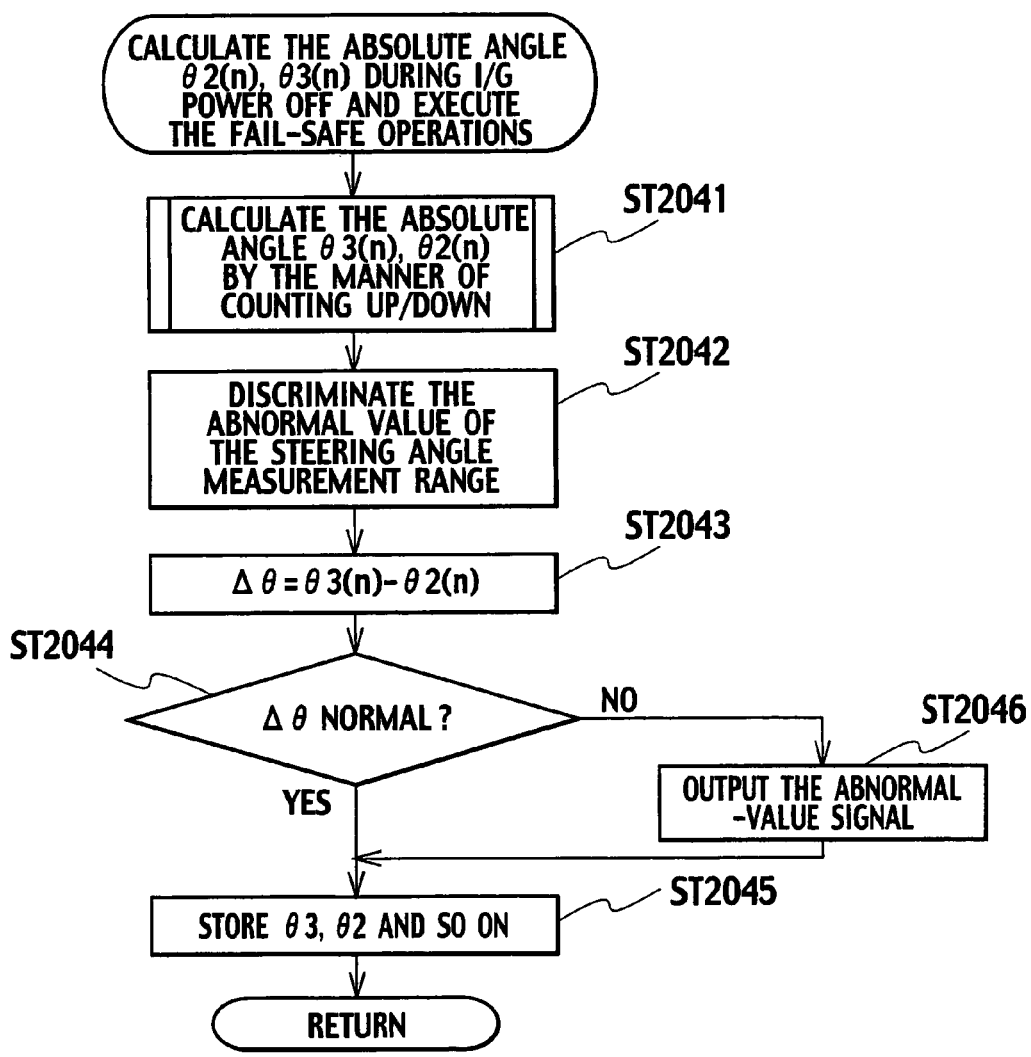
FIG. 28 is a flowchart illustrating another basic sequence of operations of the rotation angle sensor.

In step ST204, the rotation angle sensor 1-2 executes the operations in steps ST2041 to ST2046 shown in FIG. 28.

In step ST2041, the rotation angle sensor 1-2 executes the same operation as that of step ST17 shown in FIG. 9, calculating the count absolute angles θ 2 (n), θ 3 (n). However, a sampling time interval Tsam' satisfies both of formulae (52) and (53) described below. Accordingly, sampling time interval Tsam' in step ST2041 is longer than the sampling time interval Tsam.

$$Tsam' < (\text{of } Tsam\ 2 \text{ and } Tsam3, \text{ a lower value}) \quad (52)$$

$$Tsam < Tsam \quad (53)$$

In step ST2042, the rotation angle sensor 1-2 executes the same operation as that of step ST5 shown in FIG. 9 for the count absolute angles θ 2 (n), θ 3 (n) calculated in step ST2041.

In step ST2043, the rotation angle sensor 1-2 calculates the angular difference Δ θ between the current count absolute angle θ 2 (n) and the current count absolute angle θ 3 (n) that are calculated in step ST2041.

In succeeding step ST2044, the processor 5 discriminates whether the currently calculated angular difference Δ θ and the reference angular difference Δ Θ satisfy the formula (29). If the processor 5 discriminates that no such formula is satisfied (step ST2044:YES), then, the operation proceeds to step ST2045 and if found to be satisfied (step ST2044:NO), the operation proceeds to step ST2046.

In step ST2045, the processor 5 stores values S2 (n), S3 (n) of digital signals, cycle values j2 (n), j3 (n) and count absolute angles θ 2 (n), θ 3 (n), currently calculated in step ST2041 for detection, in a memory. Subsequently, the rotation angle sensor 1-2 allows the operation to return to step ST203 shown in FIG. 27.

In step ST2046, the processor 5 discriminates that the count absolute angles θ 2 (n), θ 3 (n) takes abnormal values, outputting an abnormal-value signal to an upper rank system on a vehicle. Thereafter, the rotation angle sensor 1-2 allows the operation to proceed to step ST2045.

Figure 27:
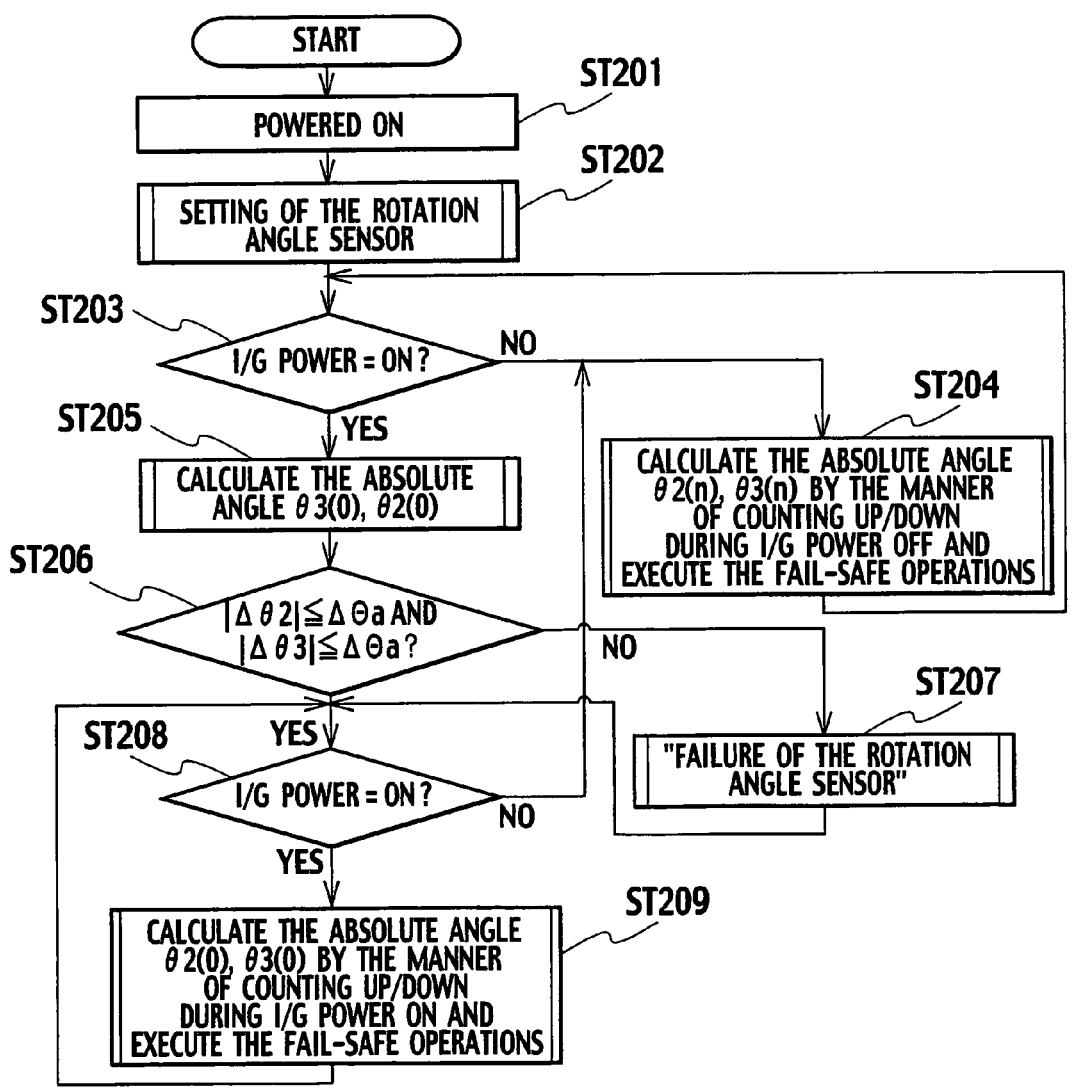
FIG. 27 is a flowchart illustrating a basic sequence of operations of the rotation angle sensor.

In step ST207 shown in FIG. 27, the rotation angle sensor 1-2 executes the same operation as that of step ST4 shown in FIG. 9 for calculating the count absolute angles θ 2 (n) and θ 3 (n), which in turn are stored in the memory.

In step ST206, the processor 5 calculates an angular difference Δ θ 2 between the cycle-value absolute angle θ 2 (0), calculated in step ST205, and the current count absolute angle θ 2 (n), and an angular difference Δ θ 2 between the cycle-value absolute angle θ 3 (0), calculated in step ST205, and the current count absolute angle θ 3 (n). Here, in th absence of the count absolute angles θ 2 (n) and θ 3 (n) stored in the memory, the processor 5 calculates the angular differences Δ θ 2 and Δ θ 3 by substituting the count absolute angles θ 2 (n) and θ 3 (n) with the newest cycle-value absolute angles θ 2 (0) and θ 3 (0) retained in step ST202. Subsequently, the processor 5 makes discrimination based on the calculated angular differences Δ θ 2 and Δ θ 3 to find whether formulae (54) and (55), expressed below, are satisfied. Here, in the formulae (54) and (55), the magnitude of the reference angular difference Δ Θ takes a value of, for instance, 3 (degrees).

$$|\Delta\theta 2| \leq \Delta\Theta a \quad (54)$$

$$|\Delta\theta 3| \leq \Delta\Theta a \quad (55)$$

As a result, if it is discriminated that both the formulae (54) and (55) are satisfied (step ST206: YES), the processor 5 allows the operation proceed to step ST208 and if not (step ST206: NO), the operation proceeds to step ST207.

In step ST207, the processor 5 discriminates that the cycle-value absolute angles θ 2 (0), θ 3 (0) and the count absolute angles θ 2 (n), θ 3 (n) take the abnormal values, thereby outputting an abnormal-value signal to the upper rank system on the vehicle. Thereafter, the rotation angle sensor 1-2 allows the operation to proceed to step ST208.

In step ST208, the rotation angle sensor 1-2 allows the operation to proceed to step ST209 when the ignition is turned on (step ST208: YES) and if the ignition remains turned off (step ST208: NO), the operation is routed back to step ST204.

Figure 29:
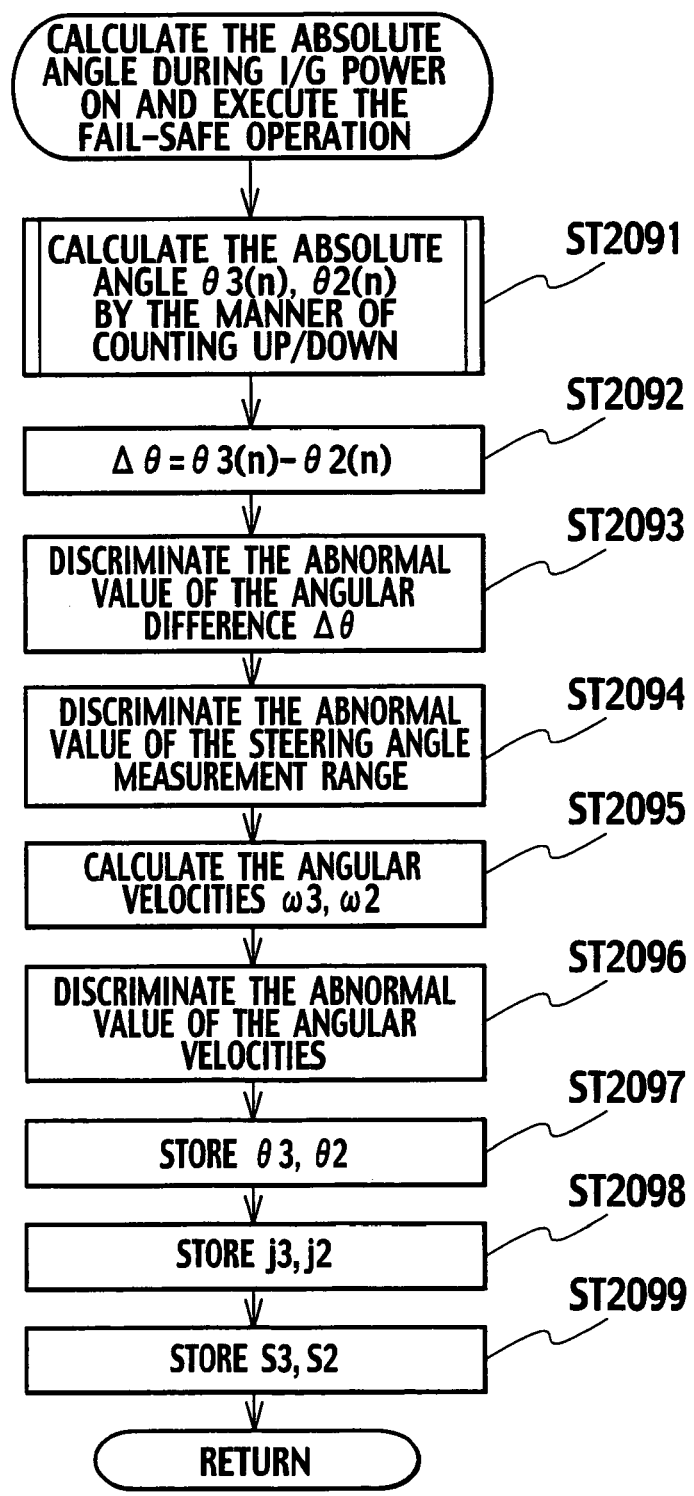
FIG. 29 is a flowchart illustrating a further basic sequence of operations of the rotation angle sensor.

In step ST209, the rotation angle sensor 1-2 executes the same operations as those of step ST2091 to ST2099 shown in FIG. 29. Here, the operations in step ST2091 to ST2099 are similar to the operations in step ST17 to ST19 shown in FIG. 9 and the operations in step ST2094 to ST2099 are similar to the operations in step ST10 to ST15 shown in FIG. 9.

From the foregoing, it will be appreciated that with the second embodiment, even if the ignition remains turned off, the rotation angle sensor 1-2 is able to output the abnormal-value signal to the upper rank system on the vehicle under a situation where the count absolute angles θ 2 (n), θ 3 (n) take the abnormal values (see steps ST2041 to ST2045). Accordingly, the rotation angle sensor 1-2 is able to protect the upper rank system on the vehicle from erroneous operation during a turned-off state of the ignition, making it possible to prevent the upper rank system on the vehicle from erroneous operation in a more reliable manner than that attained by the first embodiment. Further, the rotation angle sensor 1-2 has further improved reliability and precision than those of the first embodiment. For instance, even under circumstances where during a turned-off period of the ignition, either one of the magnet sensors 22, 32 fails to operate to cause the count absolute angles θ 2 (n), θ 3 (n) to take the abnormal values, the next lower the rotation angle sensor 1-2 is able to further immediately output the abnormal-value signal than the first embodiment.

Further, immediately after the ignition of the vehicle is turned on, the rotation angle sensor 1-2 is able to discriminate where the count absolute angles θ 2 (n), θ 3 (n) take the abnormal values and if the abnormal-values are found, the abnormal-value signal is outputted to the upper rank system on the vehicle. Consequently, the rotation angle sensor 1-2 is able to protect the upper rank system on the vehicle from erroneous operation immediately after the ignition is turned on (for instance, before a steering wheel is rotated).

Furthermore, with the ignition turned off, the sampling time interval Tsam' is longer than the sampling time interval Tsam when the ignition is turned on, enabling power consumption of a battery, caused by the operation of the rotation angle sensor 1-2, to be minimized.

Also, both the count absolute angles θ 2 (n), θ 3 (n) are calculated during a period in which the ignition remains turned off for the reasons listed below. That is, although if either one of the magnet sensors 22, 32 fails to operate during the period in which the ignition remains turned off, calculating in such a way enables the rotation angle sensor 1-2 to output the abnormal-value signal during a period between time at which the relevant failure occurs and time immediately after the ignition is turned on, the presence of an availability to calculate only one of the count absolute angles θ 2 (n), θ 3 (n) causes the rotation angle sensor 1-2 to be susceptible to encounter a difficulty in outputting the abnormal-value signal during the period between time at which the relevant failure occurs and time immediately after the ignition is turned on.

Figure 30:
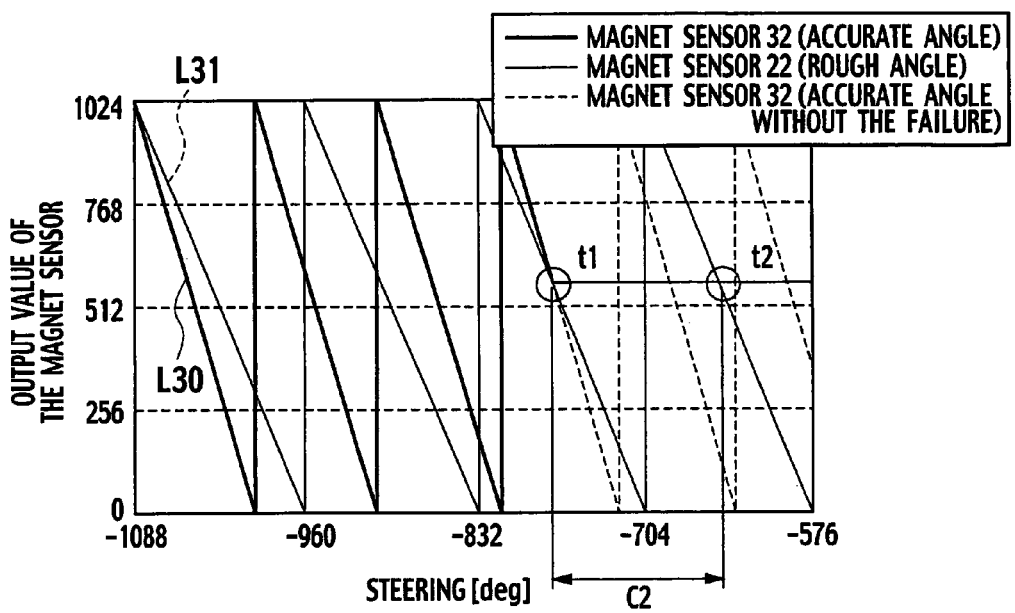
FIG. 30 is a characteristic view illustrating the relationship between the value of the digital signal, outputted from the magnet sensor, and the actual absolute angle of the steering shaft.
Figure 31:
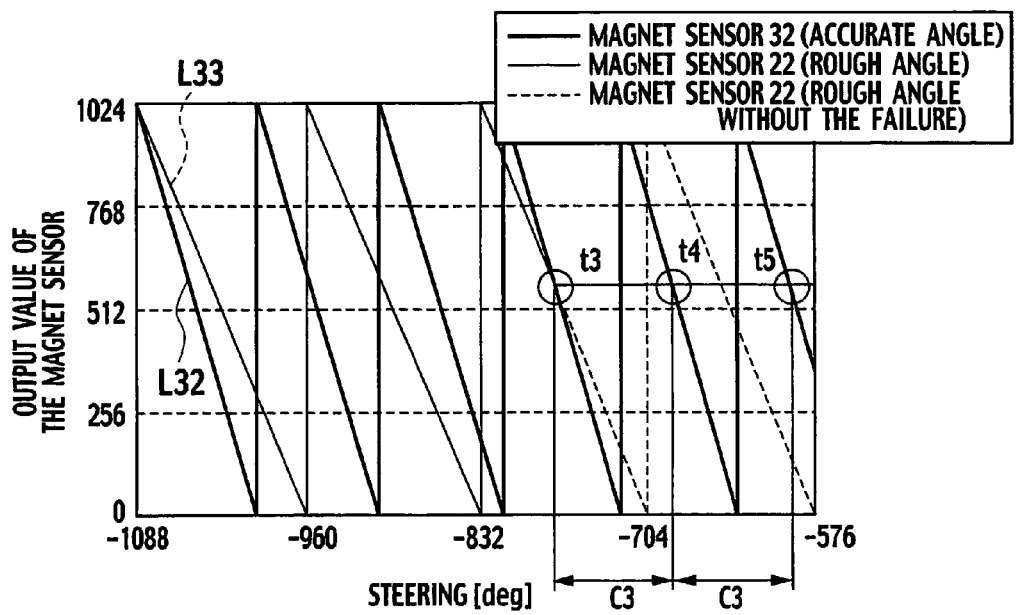
FIG. 31 is a characteristic view illustrating the relationship between the value of the digital signal, outputted from the magnet sensor, and the actual absolute angle of the steering shaft.

Hereunder, the relevant reasons are described in detail with reference to FIGS. 30 and 31. FIGS. 30 and 31 show graphs L30 to L33 that are plotted on a plane in terms of an actual steering angle of a steering shaft indicated on the abscissa and values of digital signals indicated on the coordinate. The graphs L30, L32 show the relationships between the actual steering angle of the steering shaft and a signal S3 of the digital signal. Also, the graphs L31, L33 show the relationships between the actual steering angle of the steering shaft and a signal S3 of the digital signal. Besides, if the magnet sensors 22, 32 or the detection gears 2, 3 encounter failures, the values S2, S3 of the digital signals are constant.

First, description is made of a case in which only the count absolute angle θ 3 (n) is calculated. In this case, since the rotation angle sensor 1-2 calculates only the count absolute angle θ 3 (n), the abnormal-value signal cannot be outputted through the operation in step ST204. As a consequence, for the rest of a period immediately after the ignition is turned on, the rotation angle sensor 1-2 is able to output the abnormal-value signal in steps ST206 and ST207. Also, in this case, if the formula (55) is not satisfied in step ST206, the operation proceeds to step ST207. However, as shown in FIG. 30, under a situation where after the magnet sensor 32 encounters the failure at time t1, the ignition is turned on at time t2, the count absolute angle θ 3 (n), calculated at time t2, and the count absolute angle θ 3 (n), calculated immediately before time t2 coincide with one another. Accordingly, in cases where the ignition is turned on at time t2, since the formula (55) is satisfied in step ST206, the rotation angle sensor 1-2 encounters a difficulty in permitting the operation to proceed to step ST207. In other words, the rotation angle sensor 1-2 cannot output the abnormal-value signal until a time immediately after the ignition is turned on when a failure occurs in the magnet sensor 32.

Next, description is made of a case where only the count absolute angle θ 2 (n) is calculated. In this case, since the rotation angle sensor 1-2 calculates only the count absolute angle θ 2 (n), the abnormal-value signal cannot be outputted through the operation in step ST204. Accordingly, the rotation angle sensor 1-2 is able to output the abnormal-value signal in steps ST206 and ST207 until a time immediately after the ignition is turned on. Also, in this case, if the formula (54) is not satisfied in step ST206, the operation proceeds to step ST207. However, as shown in FIG. 31, under a situation where after the magnet sensor 22 encounters the failure at time t3, the ignition is turned on at times t4 or t5, the count absolute angle θ 2 (n), calculated at times t4 or t5, and the count absolute angle θ 2 (n), calculated immediately before the ignition is turned on, coincide with one another. Accordingly, in cases where the ignition is turned on at times t4 or t5, since the formula (54) is satisfied in step ST206, the rotation angle sensor 1-2 encounters a difficulty in permitting the operation to proceed to step ST207. In other words, the rotation angle sensor 1-2 cannot output the abnormal-value signal until a time immediately after the ignition is turned on when the magnet sensor 32 encounters the failure.

In contrast, calculating both the count absolute angles θ 2 (n), θ 3 (n) during the period in which the ignition remains turned off causes no such issues to occur. For instance, in a case shown in FIG. 30, the rotation angle sensor 1-2 is able to output the abnormal-value signal during a period from time t1 to time t2. In a case shown in FIG. 31, the rotation angle sensor 1-2 is able to output the abnormal-value signal during a period from time t3 to time t4. Consequently, upon calculating both the count absolute angles θ 2 (n), θ 3 (n), the rotation angle sensor 1-2 is able to output the abnormal-value signal during a period from time at which the relevant failure occurs to time immediately after the ignition is turned on under circumstances where any of the magnet sensors 22, 32 encounters the failure during the period in which the ignition remains turned off.

Next, a modified form of the rotation angle sensor 1-2 is described. The rotation angle sensor 1-2 of the presently filed modified form (hereinafter referred to as "rotation angle sensor 1-2a") is substantially similar in structure to the rotation angle sensor 1-2 but differs in operations in steps ST204 to ST206. Hereunder, these operations are described below in detail.

In step ST204, the rotation angle sensor 1-2a calculates only the cycle values j2 (n), j3 (n) due to the operation indicated in the count absolute-angle calculating operation. In step ST205, the rotation angle sensor 1-2a calculates the count absolute angles θ 2 (n), θ 3 (n) based on, in addition to the cycle-value absolute angles θ 2 (0), θ 3 (0), the current cycle values j2 (n), j3 (n) calculated in step ST204, and the values S2, S3 of the digital signals read at a timing in step ST205. Subsequently, the rotation angle sensor 1-2a stores the cycle-value absolute angles θ 2 (0), θ 3 (0) and the count absolute angles θ 2 (n), θ 3 (n) that are calculated.

In step ST206, the rotation angle sensor 1-2a calculates the above-described angular differences Δ θ 2 and Δ θ 3 based on the cycle-value absolute angles θ 2 (0), θ 3 (0) and the count absolute angles θ 2 (n), θ 3 (n) that are calculated in step ST205. Then, the processor 5 discriminates, based on the calculated angular differences Δθ 2 and Δ θ 3, whether the above-described formulae (54) and (55) are satisfied. Subsequently, if both the above-described formulae (54) and (55) are satisfied (step ST206: YES), the rotation angle sensor 1-2a allows the operation to proceed to step ST208 and if not (step ST206: NO), the operation proceeds to step ST207.

With the rotation angle sensor 1-2a, in cases where the magnet sensors 22, 32 encounter the failure during the period in which the ignition remains turned off, the abnormal-value signal can be outputted immediately after the ignition is turned on.

(Third Embodiment)

Next, a third embodiment according to the present invention is described with reference to the accompanying drawings. A rotation angle sensor 1-3 of the third embodiment is substantially similar in structure to the rotation angle sensor 1 but differs from the same in that a cylinder sensor is provided for detecting whether an ignition key is inserted to a key cylinder and in respect of abnormal judgment operation for the cycle-value absolute angles θ 2 (0), θ 3 (0). Further, the rotation angle sensor 1-3 is installed on a vehicle equipped with a lock mechanism (lock means).

The cylinder sensor cylinder sensor detects whether the ignition key is inserted to the key cylinder and a key signal, related to a detected result, to the processor 5. This enables the rotation angle sensor 1-3 to execute operations depending whether the ignition key is inserted to the key cylinder.

With the ignition key pulled out from the key cylinder, the lock mechanism enables rotation within a lockable range of a steering shaft. While the lockable range covers 360 (deg) under normal conditions, it is not sure, depending on an absolute angle of a steering shaft at which the ignition key is pulled out from the key cylinder, to find at which position of the range in ±360 (deg) about a center of the absolute angle of the steering shaft the steering shaft is locked.

Figure 32:
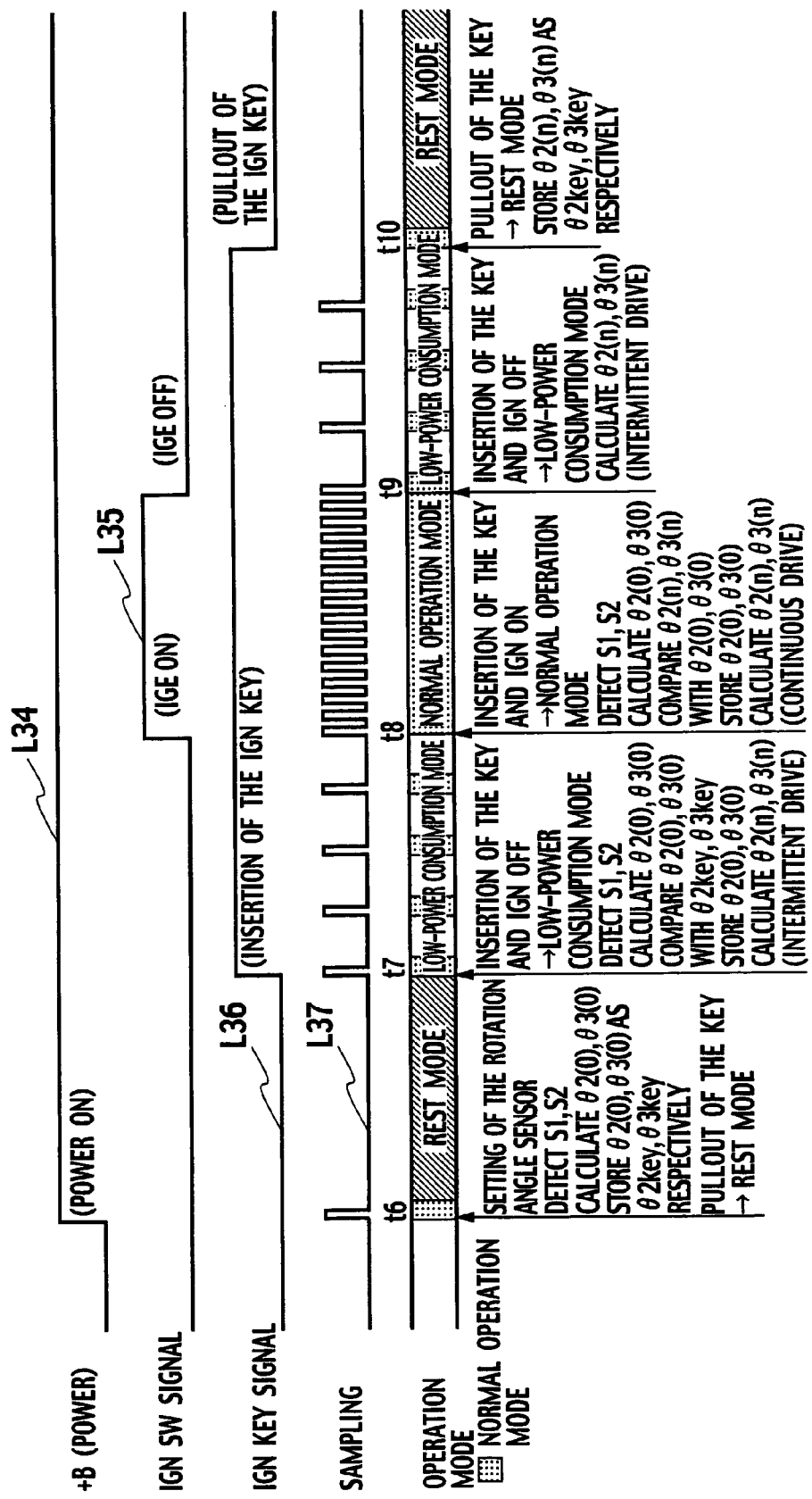
FIG. 32 is a timing chart illustrating the relationship between time and a content of operations of the rotation angle sensor.

First, a basic sequence of operations of the rotation angle sensor 1-3 is described with reference to timing charts L34 to L37 shown in FIG. 32. The timing chart L34 shows the relationship between a time and a status of a power supply. The timing chart L35 shows the relationship between a time and a status of an ignition. Further, timing chart L36 shows the relationship between a time and a status of an ignition key. Timing chart L37 shows the relationship between a time and timing at which a digital signal is read out. Also, a peak portion of timing chart L37 shows the timing at which the digital signal is read out. As shown in FIG. 32, the rotation angle sensor 1-3 is powered on at a time t6 and the ignition key is inserted to the key cylinder at a time t7. Also, at a time t10, the ignition key is pulled out from the key cylinder.

If the rotation angle sensor 1-3 is powered on at time t6, the rotation angle sensor 1-3 executes the operations in step ST201 and ST202. Here, when executing the operation in step ST202, the rotation angle sensor 1-3 stores the calculated newest cycle-value absolute angles θ 2 (0), θ 3 (0) in a memory as lock range reference angles θ 2key, θ 3key. Thereafter, the rotation angle sensor 1-3 operates in a rest mode (more particularly, in a mode in which no operations shown in FIGS. 27 to 29 are executed).

If the ignition key is inserted to the key cylinder at time t7, the rotation angle sensor 1-3 executes the same operation as that of step ST205 shown in FIG. 27 for thereby calculating the cycle-value absolute angles θ 2 (0) and θ 3 (0). Subsequently, the rotation angle sensor 1-3 calculates a first lock reference range, indicative of a range covering ±360 (deg) about a center of the lock range reference angle θ 2key and a second lock reference range, indicative of a range covering ±360 (deg) about a center of the lock range reference angle θ 3key. Thereafter, the rotation angle sensor 1-3 discriminates based on the currently calculated cycle-value absolute angles θ 2 (0) and θ 3 (0) and the first and second lock reference ranges whether a condition, described below, is satisfied.

Condition: The cycle-value absolute angle θ 2 (0) is contained in the first lock reference range and the cycle-value absolute angle θ 3 (0) is contained in the second lock reference range.

As a result, if discrimination is made that the relevant condition is satisfied, the rotation angle sensor 1-3 executes the same operations as those of steps ST203 and 204 shown in FIG. 27. On the contrary, if discrimination is made that no relevant condition is satisfied, it is judged that the currently calculated cycle-value absolute angles θ 2 (0) and θ 3 (0) fall in abnormal values, the lock mechanism encounters a failure or a location, in which the rotation angle sensor 1-3 is mounted, is changed, upon which an abnormal-value signal is outputted to an upper rank system on a vehicle. Thereafter, the rotation angle sensor 1-3 executes the same operations as those of steps ST203 and 204.

Further, such judgment operation can be executed for the reasons described below. That is, after the ignition key is pulled out from the key cylinder, the lock mechanism is operative and, hence, the steering shaft has no probabilities to be rotated in a range exceeding 360 (deg) in leftward or rightward directions with respect to an absolute angle at a time in which the ignition key is pulled out from the key cylinder.

Accordingly, under a situation where the lock mechanism and the magnet sensors 22, 23 remain normally operative and, during a period in which the ignition key is pulled out from the cylinder key, no located position of the rotation sensor 1-3 is changed from the original position, it is supposed that the above-described condition is satisfied. Accordingly, the rotation angle sensor 1-3 is able to execute the above-described judgment operation.

With the ignition turned on at time t8, the rotation angle sensor 1-3 discriminates in step ST203 shown in FIG. 27 that the ignition is turned on and executes the same operations as those of steps ST205 to ST209.

With the ignition turned off at time t9, the rotation angle sensor 1-3 allows the operation to proceed from step ST208, shown in FIG. 27, to step ST204. Thereafter, the rotation angle sensor 1-3 executes the same operations as those of steps ST203 and ST204.

If the ignition key is pulled out from the key cylinder at time t10, the rotation angle sensor 1-3 stores the current cycle-value absolute angles θ 2 (0), θ 3 (0) in the memory as the lock range reference angles θ 2key, θ 3key. Thereafter, the rotation angle sensor 1-3 operates in the rest mode and if the ignition key is inserted to the key cylinder, the rotation angle sensor 1-3 executes the operations subsequent to time t7.

From the foregoing, with the third embodiment, even under circumstances where failure occurs in the lock mechanism during a period in which the ignition key remains pulled out, the rotation angle sensor 1-3 is able to output the abnormal-value signal immediately after the ignition key is inserted to the key cylinder. As a consequence, since the rotation angle sensor 1-3 is able to protect the upper rank system on the vehicle from erroneous operation from time immediately after the ignition key is inserted to the key cylinder, the erroneous operation of the upper rank system on the vehicle can be more reliably protected than the first embodiment. Also, the rotation angle sensor 1-3 has more improved reliability and precision than those of the first embodiment.

Further, since the cylinder sensor and the lock mechanism are of the type that are installed on the vehicle, to rotation angle sensor 1-3 can be realized with no particular component parts being added to the rotation angle sensor 1 and the rotation angle sensor 1-2.

Furthermore, since the rotation angle sensor 1-3 operates in the rest mode until the ignition key is inserted to the key cylinder after it is pulled out from the key cylinder, power consumption of a battery can be further minimized to a lower level than that attained by a situation under which the same operations are executed by the rotation angle sensor 1-2 for that time interval.

Also, the second and third embodiments may take the same application as that of the first embodiment. Also, while the third embodiment has been described with reference to an exemplary structure wherein the lock reference range covers a range of ±360 (deg) about the lock range reference angles θ 2key, θ 3key, the lock reference range may take other ranges.

What is claimed is:

1. A rotation angle sensor for detecting the rotation angle of a steering shaft of a vehicle in order to prevent erroneous operation, the rotation angle sensor comprising:
    first and second detection gears rotatable with a steering shaft;
    a first detector configured to detect a rotation angle of the first detection gear;
    a second detector configured to detect a rotation angle of the second detection gear;
    a processor configured to calculate a rotation angle of the steering shaft based on the rotation angles detected by the first and second detectors, wherein the processor includes memory configured to store a value of the calculated rotation angle; and
    a discriminator configured to discriminate whether the rotational angle of the steering shaft, calculated by the processor, falls in an abnormal value;
    wherein a least common multiple between a cycle of the first detector and a cycle of the second detector is greater than a steering angle measurement range.

2. The rotation angle sensor according to claim 1, wherein the processor calculates a first rotation angle of the steering shaft based on a cycle value of the first detector and the rotation angle detected by the first detector and calculates a second rotation angle of the steering shaft based on a cycle value of the second detector and the rotation angle detected by the second detector, and the discriminator discriminates whether the first and second rotation angles, calculated by the processor, fall in abnormal values.

3. The rotation angle sensor according to claim 2, wherein the processor calculates a cycle value of the first detector and a cycle value of the second detector based on the rotation angle detected by the first and second detectors.

4. The rotation angle sensor according to claim 3, wherein the processor calculates the cycle value of the first detector and the cycle value of the second detector based on the rotation angles detected by the first and second detectors, calculates the current cycle value of the first detector based on the cycle value of the first detector calculated in a preceding stage and the rotational angles detected by the first detector in preceding and current stages, and calculates a current style value of the second detector based on the cycle value of the second detector calculated in the preceding stage and the rotational angle detected by the second detector in the preceding and current stages.

5. The rotation angle sensor according to claim 4, wherein the processor calculates the cycle values of the first and second detectors based on the rotation angle detected by the first and second detectors before an ignition of a vehicle is turned off, calculates a current cycle value of the first detector based on the cycle value of the first detector calculated in the preceding stage and the rotational angle detected by the first detector in the preceding and current stage when ignition of the vehicle is turned off, and calculates the current cycle value of the second detector based on the cycle value of the second detector calculated in the preceding stage and the rotational angle detected by the second detector in the preceding and current stages.

6. The rotation angle sensor according to claim 5, wherein the
    processor calculates a first angular difference of at least one of the first and second rotation angles of the steering shaft, calculated between before and after the ignition of the vehicle is turned on under a situation where the ignition of the vehicle shifts from a turned-off state to a turned-on state, and
    the discriminator discriminates that the first and second rotation angles calculated by the processor fall in the abnormal values when the first angular difference exceeds a given first reference angular difference.

7. The rotation angle sensor according to claim 5, wherein the processor calculates at least one of the first and second rotation angles of the steering shaft based on the cycle values of at least one of the first and second detectors between before and after the ignition is turned on under a situation where the ignition of the vehicle shifts from the turned-off state to the turned-on state, and calculates a second angular difference of at least one of the first and second rotation angles of the steering shaft, calculated between before and after the ignition of the vehicle is turned on, and
    the discriminator discriminates that at least one of the first and second rotation angles calculated by the processor falls in the abnormal values when the second angular difference exceeds a given first reference angular difference.

8. The rotation angle sensor according to claim 5, wherein the processor and the discriminator operate in given operation time interval, and the operation time interval, in which the processor and the discriminator operate when the ignition of the vehicle remains turned off, is longer than an operation time interval in which the processor and the discriminator operate when the ignition of the vehicle is turned on.

9. The rotation angle sensor according to claim 2, wherein
the processor calculates a third angular difference between the calculated first rotation angle of the steering shaft and the calculated second rotation angle of the steering shaft, and
the discriminator discriminates that the first and second rotation angles calculated by the processor fall in the abnormal values when the third angular difference calculated by the processor exceeds a given second reference angular difference.

10. The rotation angle sensor according to claim 9, wherein
the second reference angular difference satisfies a formula (27-1) expressed as $$\Delta\Theta < c2/x3/2 \qquad (27\text{-}1)$$

wherein $\Delta\Theta$ is the second reference angular difference; $c2$ is the cycle of the first detector; and $x3$ is and the number of cycles of the second detector.

11. The rotation angle sensor according to claim 2, wherein
the processor calculates a first angular velocity of the steering shaft based on a first calculated rotation angle of the steering shaft and a second angular velocity of the steering shaft based on a calculated second rotation angle of the steering shaft, and
the discriminator discriminates that the first and second angular velocities of the steering shaft which are calculated by the processor fall in abnormal values when at least one of the first and second angular velocities which are calculated by the processor exceeds a given reference angular velocity.

12. The rotation angle sensor according to claim 2, further comprising:
a first magnet mounted on the first detection gear; and
a second magnet mounted on the second detection gear, wherein
the first detector detects a magnetic intensity of the first magnet for detecting a rotary angle of the first detection gear based on the magnetic intensity of the first magnet,
the second detector detects a magnetic intensity of the second magnet for detecting a rotary angle of the second detection gear based on the magnetic intensity of the second magnet, and
the discriminator discriminates that the first and second rotation angles of the steering shaft, which are calculated by the processor, fall in abnormal values when at least one of the first and second magnetic intensities, detected by the first and second detectors, respectively, exceeds a given intensity range.

13. The rotation angle sensor according to claim 2, wherein
the discriminator discriminates that the first and second rotation angles of the steering shaft, which are calculated by the processor, fall in abnormal values when at least one of the first and second rotation angles of the steering shaft, which are calculated by the processor, exceeds a steering angle measurement range.

14. The rotation angle sensor according to claim 2, wherein
the rotation angle sensor is installed on a vehicle having lock means that is rotatable within a given lock range of the steering shaft when an ignition key is pulled out from a key cylinder,
the processor calculates at least one of the first and second rotation angles of the steering shaft and calculates a lock reference range corresponding to the lock range when the ignition key is inserted to the key cylinder, and
the discriminator discriminates that at least one of the first and second rotation angles of the steering shaft falls in abnormal values when the first or second rotation angles of the steering shaft, calculated when the ignition key is inserted to the key cylinder, exceeds the lock reference range.

* * * * *